United States Patent
Noda

(10) Patent No.: US 11,485,222 B2
(45) Date of Patent: Nov. 1, 2022

(54) APPARATUS FOR OPENING AND CLOSING A LID OF A VEHICLE

(71) Applicant: ANSEI CORPORATION, Obu (JP)

(72) Inventor: Masaaki Noda, Nagoya (JP)

(73) Assignee: ANSEI CORPORATION, Obu (JP)

( * ) Notice: Subject to any disclaimer, the term of this patent is extended or adjusted under 35 U.S.C. 154(b) by 374 days.

(21) Appl. No.: 16/814,391

(22) Filed: Mar. 10, 2020

(65) Prior Publication Data

US 2021/0061092 A1 Mar. 4, 2021

(30) Foreign Application Priority Data

Aug. 26, 2019 (JP) .............................. JP2019-153422

(51) Int. Cl.
*B60K 15/05* (2006.01)
*E05B 63/22* (2006.01)
(Continued)

(52) U.S. Cl.
CPC .............. *B60K 15/05* (2013.01); *B60L 53/16* (2019.02); *E05B 63/22* (2013.01); *E05B 81/06* (2013.01);
(Continued)

(58) Field of Classification Search
CPC .......... E05B 83/34; E05B 63/22; E05B 81/06; E05B 81/14; E05B 81/16; E05B 81/26;
(Continued)

(56) References Cited

U.S. PATENT DOCUMENTS

2010/0242363 A1 9/2010 Hirota et al.
2014/0291996 A1 10/2014 Basavarajappa et al.
(Continued)

FOREIGN PATENT DOCUMENTS

CN 109532473 A 3/2019
DE 102015005303 A1 10/2016
(Continued)

OTHER PUBLICATIONS

Extended European Search Report from the European Patent Office dated Oct. 5, 2020 in related EP application No. 20 16 1445, including Search Opinion and Search Report.
(Continued)

*Primary Examiner* — Alyson M Merlino
(74) *Attorney, Agent, or Firm* — J-Tek Law PLLC; Jeffrey D. Tekanic; Scott T. Wakeman

(57) ABSTRACT

An apparatus (1) for opening and closing a lid (lid body) of a vehicle includes a linearly-movable shaft (10) supported by a housing (90) such that the shaft (10) is linearly movable along, and nonrotatable around, an axial center (X10); and a rotary shaft (30) supported by the linearly-movable shaft (10) such that it is linearly movable along and rotatable around the axial center (X10). A stopper (50) is supported by the housing (90) and is displaceable between a blocking position at which the stopper (50) prohibits the linearly-movable shaft (10) from moving from a second position to a first position, and a nonblocking position at which the stopper (50) is separated from the linearly-movable shaft (10). The stopper (50) is biased toward the blocking position and displaces to the nonblocking position in response to a manual opening operation for displacing the lid to the open position.

20 Claims, 7 Drawing Sheets

(51) Int. Cl.
  *E05B 81/06* (2014.01)
  *E05B 81/16* (2014.01)
  *E05B 81/36* (2014.01)
  *E05B 81/66* (2014.01)
  *E05B 83/34* (2014.01)
  *B60L 53/16* (2019.01)
  *E05B 81/56* (2014.01)

(52) U.S. Cl.
  CPC .............. *E05B 81/16* (2013.01); *E05B 81/36* (2013.01); *E05B 81/56* (2013.01); *E05B 81/66* (2013.01); *E05B 83/34* (2013.01); *B60K 2015/0538* (2013.01); *B60K 2015/0584* (2013.01); *E05Y 2900/534* (2013.01)

(58) Field of Classification Search
  CPC .......... E05B 81/30; E05B 81/34; E05B 81/36; E05B 81/50; E05B 81/56; E05B 81/66; E05B 81/68; E05B 81/90; B60K 15/05; B60K 2015/0515; B60K 2015/053; B60K 2015/0561; B60K 2015/0573; B60K 2015/0584; B60K 2015/0538; Y10T 292/0863; Y10T 292/0864; Y10T 292/0866; Y10T 292/0867; Y10T 292/0868; E05C 5/00; E05C 5/02; E05C 2005/005
  See application file for complete search history.

(56) References Cited

U.S. PATENT DOCUMENTS

| | | |
|---|---|---|
| 2015/0115620 A1 | 4/2015 | Ito et al. |
| 2016/0348408 A1 | 12/2016 | Watanabe |
| 2017/0043660 A1 | 2/2017 | Horikawa et al. |
| 2018/0029469 A1 | 2/2018 | Persiani et al. |
| 2018/0105036 A1 | 4/2018 | Guardianelli |
| 2020/0156612 A1 | 5/2020 | Ikuma et al. |
| 2020/0217122 A1 | 7/2020 | Noguchi et al. |
| 2021/0039620 A1 | 2/2021 | Mitsugi et al. |
| 2021/0070165 A1 | 3/2021 | Noda |
| 2021/0156177 A1 | 5/2021 | Noda |
| 2021/0172234 A1 | 6/2021 | Rampalli et al. |

FOREIGN PATENT DOCUMENTS

| | | |
|---|---|---|
| DE | 102015005646 A1 | 11/2016 |
| EP | 1227948 B1 | 12/2003 |
| EP | 3078531 A1 | 10/2016 |
| EP | 3078792 A1 | 10/2016 |
| EP | 3265333 A1 | 1/2018 |
| EP | 3348432 A1 | 7/2018 |
| JP | H0482176 U | 7/1992 |
| JP | 2003113687 A | 4/2003 |
| JP | 2015086606 A | 5/2015 |
| JP | 2015132085 A | 7/2015 |
| JP | 2015209689 A | 11/2015 |
| JP | 2016223150 A | 12/2016 |
| JP | 2017043893 A | 3/2017 |
| JP | 2017043894 A | 3/2017 |
| JP | 2017043939 A | 3/2017 |
| JP | 6350451 B2 | 7/2018 |
| JP | 3219522 U | 12/2018 |
| WO | 0128798 A1 | 4/2001 |
| WO | 2016139690 A1 | 9/2016 |

OTHER PUBLICATIONS

Unpublished U.S. Appl. No. 16/814,488.
Unpublished U.S. Appl. No. 16/986,847.
Extended European Search Report from the European Patent Office dated Feb. 12, 2021 in related EP application No. 20190279.8, including Search Opinion, Search Report and examined claims 1-9.
Machine Translation of Search Report from the Japanese Patent Office dated Jan. 26, 2022, in related JP application No. 2019-162890, which includes translation of examined claims 1-3.
Office Action and Search Report from the Japanese Patent Office dated Feb. 1, 2022 in related JP application No. 2019-211949; including machine translation thereof and of examined claims 1-9.
Office Action from the European Patent Office dated Nov. 18, 2021 in related EP application No. 20161445.0, including examined claims 1-12.
Office Action from the European Patent Office dated Nov. 18, 2021 in related EP application No. 20161722.2, including examined claims 1-9.
Office Action and Search Report from the Japanese Patent Office dated Feb. 1, 2022, in related JP application No. 2019-153422, including machine translation thereof and of examined claims 1-5.
Extended European Search Report from the European Patent Office dated Oct. 6, 2020, in related EP application No. 20 16 1722, including Search Opinion and Search Report and examined claims 1-11.
Office Action from the United States Patent Office dated Apr. 8, 2022 in related U.S. Appl. No. 16/814,488, including examined claims 1-20.

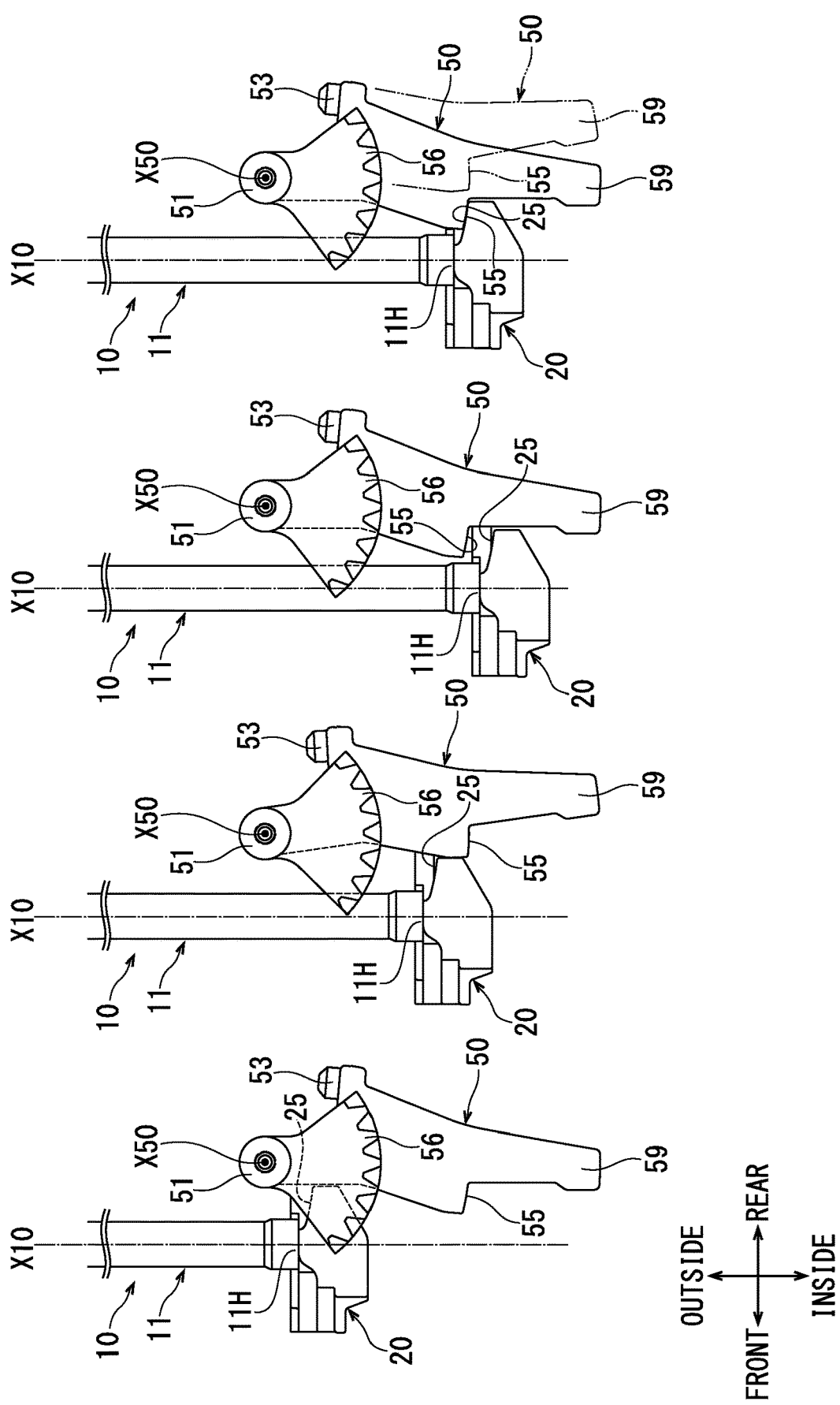

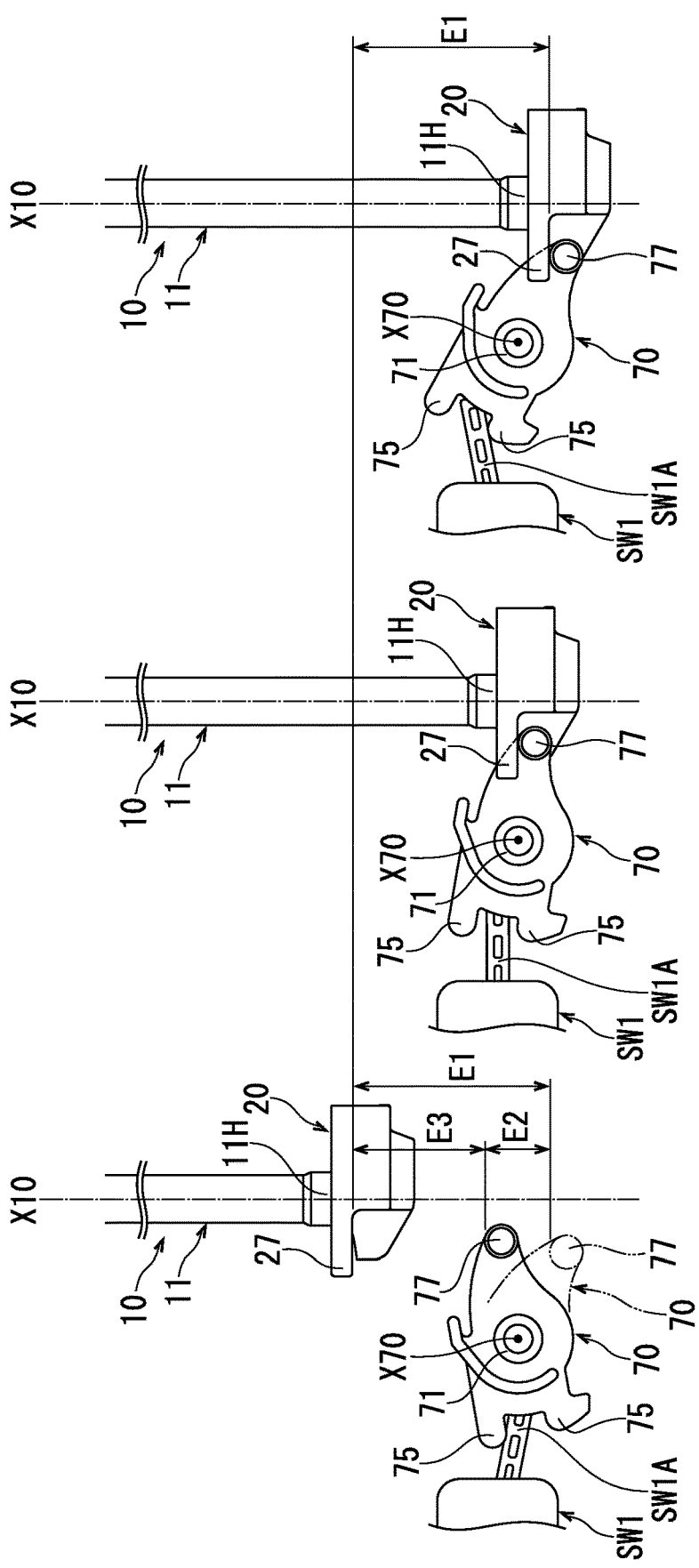

APPARATUS FOR OPENING AND CLOSING A LID OF A VEHICLE

TECHNICAL FIELD

The present invention generally relates to an apparatus for opening and closing/latching a lid (lid body) of a vehicle.

BACKGROUND ART

Japanese Laid-open Patent Publication No. 2017-43939 discloses an example of a known lid-body opening/closing apparatus for use in vehicles, i.e. an apparatus for opening and closing a lid body of a vehicle. The lid body is a fuel door in this prior art document. This lid-body opening/closing apparatus is provided between an opening provided in the vehicle body and the lid body (fuel door) that is capable of opening/closing the opening. The lid body is displaceable (pivotable) in a pivot range that includes an open position at which the opening is open, a closed position at which the opening is closed, and a pressed-in position at which the lid body is pressed in from the closed position toward a side opposite the open position.

This lid-body opening/closing apparatus comprises a housing, a linearly-movable shaft, a rotary shaft, a latch, and a pawl. The housing is provided on the vehicle body.

The linearly-movable shaft extends centered on an axial center that passes through (intersects) the opening. The linearly-movable shaft is capable of undergoing linear reciprocating motion in (along) the of the axial center direction in a linear range that includes a first position corresponding to the open position, a second position corresponding to the closed position, and a third position corresponding to the pressed-in position. In addition, the linearly-movable shaft is supported by the housing such that it is nonrotatable around the axial center and is biased toward the first position.

The rotary shaft also extends centered on the axial center. The rotary shaft is supported by the linearly-movable shaft such that it is capable of undergoing linear reciprocating motion in (along) the direction of the axial center and is rotatable around the axial center. If the linearly-movable shaft is in the second position or the third position, then the rotary shaft rotates to a latched position that latches the lid body; and on the other hand, if the linearly-movable shaft is in the first position, then it rotates to an unlatched position that does not latch the lid body.

The latch is coupled to the linearly-movable shaft by a coupling pin of the linearly-movable shaft and a coupling hole of the latch and is also supported by the housing such that it is pivotable. A latching surface is formed on the latch. The pawl is supported by the housing. The pawl engages the latching surface and is pivotable between a blocking position, which prohibits the linearly-movable shaft from moving from the second position to the first position, and a nonblocking position, at which the pawl is separated from the latching surface and is biased toward the blocking position. In addition, the pawl is displaced to the nonblocking position by an electric actuator that is energized when actuated (induced) by (in response to) a manual opening operation for displacing the lid body to the open position.

In the known lid-body opening/closing apparatus having the above-described configuration, when the lid body is pressed in from the open position to the pressed-in position, the linearly-movable shaft moves linearly to the third position and the rotary shaft rotates to the latched position, thereby latching the lid body. At this time, the pawl is biased away from the nonblocking position and is displaced to the blocking position. Furthermore, the pawl engages the latching surface of the latch and, owing to this latching engagement, prohibits the linearly-movable shaft from moving from the second position to the first position. As a result, the lid-body opening/closing apparatus holds the lid body in the closed position.

On the other hand, if a manual opening operation is performed to displace the lid body to the open position, then the electric actuator of this lid-body opening/closing apparatus is energized when actuated by that manual opening operation and thereby causes the pawl to displace to the nonblocking position so as to be separated from the latching surface of the latch. Consequently, the linearly-movable shaft is biased away from the second position and is moved to the first position, thereby causing the lid body to displace to the open position. In addition, the rotary shaft is rotated to the unlatched position, releasing the latching of the lid body.

However, in the above-described known lid-body opening/closing apparatus, it is difficult to achieve a reduction in the part count or a simplification of the structure owing to the configuration that requires both a latch and pawl. As a result, with this known lid-body opening/closing apparatus, it is difficult to achieve a lowering of the manufacturing cost. Moreover, due to possible dimensional tolerances and assembly errors in the linearly-movable shaft, the latch, and/or the pawl, there is a risk that backlash (play) will arise (be present) at the locations where these parts are coupled or will engage during operation, and thus it is difficult to reduce the occurrence of malfunctions or abnormal noises caused by such backlash.

SUMMARY OF THE INVENTION

Accordingly, one non-limiting object of the present teachings is to provide an apparatus for opening and closing/latching a lid of a vehicle (a lid-body opening/closing apparatus for use in vehicles) that can further improve the tightness of closure while simplifying the structure, achieve a lower manufacturing cost, and/or reduce the occurrence of malfunctions or abnormal noises caused by backlash among structural components of the opening/closing apparatus.

In one aspect of the present teachings, an apparatus for opening and closing/latching a lid of a vehicle (a lid-body opening/closing apparatus for use in vehicles) is provided (or is configured/adapted to be provided) between an opening, which is provided on (or in) a vehicle body, and the lid or a lid cover (lid body), which is capable of opening and closing the opening, wherein:

the lid (lid body) is displaceable (movable, pivotable) in a pivot range that includes: an open position at which the opening is open, a closed position at which the opening is closed, and a pressed-in position at which the lid body is pressed in from the closed position toward a side opposite the open position; and the apparatus comprises:
a housing provided (or configured/adapted to be provided) on the vehicle body;
a linearly-movable shaft that (i) extends centered on an axial center that passes through (intersects) the opening, (ii) is supported by the housing such that the linearly-movable shaft is capable of undergoing linear reciprocating motion in (along) the direction of the axial center in a linear range that includes a first position corresponding to the open position, a second position corresponding to the closed position, and a third position corresponding to the pressed-in position, and such that the linearly-movable shaft is nonrotatable around the axial center, and (iii) is biased toward the first position;

a rotary shaft that (i) extends centered on the axial center, and (ii) is supported by the linearly-movable shaft such that the rotary shaft is capable of undergoing linear reciprocating motion in (along) the direction of the axial center, and such that the rotary shaft is rotatable around the axial center; wherein, when the linearly-movable shaft is disposed in the second position or the third position, it rotates (is urged to rotate) to a latched position that latches the lid body, and when the linearly-movable shaft is disposed in the first position, it rotates (is urged to rotate) to an unlatched position that does not latch the lid body; and a stopper that (i) is supported by the housing, (ii) is displaceable (movable, pivotable) between a blocking position at which the stopper engages one of the linearly-movable shaft and the rotary shaft, thereby prohibiting (blocking) the linearly-movable shaft from moving from the second position to the first position, and a nonblocking position at which the stopper is separated (spaced apart) from the linearly-movable shaft, (iii) is biased toward the blocking position, and (iv) is displaced to the nonblocking position when induced by (in response to) a manual opening operation for displacing the lid body to the open position.

In the apparatus for opening and closing/latching a lid of a vehicle (lid-body opening/closing apparatus) of this aspect of the present teachings, one stopper is used instead of the latch and pawl of the above-described known lid-body opening/closing apparatus, and the stopper directly engages with or separates from one of the linearly-movable shaft and the rotary shaft. Thereby, with this apparatus for opening and closing a lid of a vehicle (lid-body opening/closing apparatus), the stopper is engageable with one of the linearly-movable shaft and the rotary shaft more reliably than the latch and pawl in the above-described known lid-body opening/closing apparatus. Furthermore, it is possible to achieve a reduction in the part count and a simplification of the structure and to also reduce the effects of dimensional tolerances, assembly errors, and the like, by using a single stopper.

Accordingly, in the apparatus for opening and closing a lid of a vehicle (lid-body opening/closing apparatus) of this aspect of the present teachings, it is possible to further improve the tightness of closure while simplifying the structure, achieve a lower manufacturing cost, and/or reduce the occurrence of malfunctions or abnormal noises caused by backlash among structural components of the apparatus for opening and closing/latching a lid of a vehicle (lid-body opening/closing apparatus). In addition, even if the manual closing operation to close the lid body is performed at high speed, the single stopper of such a lid-body opening/closing apparatus quickly follows one of the linearly-movable shaft and the rotary shaft, and therefore the lid body can be reliably held at the closed position.

In another aspect of the present teachings, the apparatus for opening and closing/latching a lid of a vehicle (lid-body opening/closing apparatus for use in vehicles) preferably comprises an electric actuator that is provided on the housing, and is energized when induced by (in response to) a manual opening operation, thereby displacing the stopper to the nonblocking position.

In this aspect, because the stopper is displaced to the nonblocking position by the electric actuator, the manual opening operation by the user can be simplified and the holding of the lid (lid body) can be easily released.

In another aspect of the present teachings, the apparatus for opening and closing/latching a lid of a vehicle (lid-body opening/closing apparatus for use in vehicles) preferably comprises a switch that is provided on the housing and assumes a connected state when the linearly-movable shaft moves to the third position. Then, the electric actuator preferably is energized when the switch is actuated by assuming (is placed into) the connected state after the lid (lid body) has been held at the closed position.

In this aspect, the holding of the lid (lid body) can be easily released by performing a manual opening operation in which the user presses in the lid body (while it is being held at the closed position) to the pressed-in position.

In another aspect of the present teachings, the linearly-movable shaft preferably comprises: a linearly-movable-shaft main body, which extends centered on the axial center and supports the rotary shaft such that it is rotatable around the axial center; and a block (hook block), which is provided on (at) an end part located on a side of the linearly-movable-shaft main body opposite from the lid body in the direction of the axial center and moves integrally with the linearly-movable-shaft main body. Furthermore, an engagement part, which engages with the stopper, preferably is formed on the block.

In this aspect, the engagement part formed on the block has the highest degree of freedom in shape among the structural members of the linearly-movable shaft and the rotary shaft. Therefore, it is possible to easily achieve (design) a shape that reliably engages the stopper.

In another aspect of the present teachings, a manual-operation part preferably is provided, integrally on the stopper, such that it is manually operable from outside the housing. Therefore, by manually operating (pushing) the stopper, it is possible to manually displace the stopper to the nonblocking position.

In this aspect, in the event that the electric actuator does not actuate, for example during repair work or at the time of an anomaly, such as when the battery is completely discharged (dead) or disconnected, the user can operate (manually push) the manual-operation part from outside of the housing to displace the lid body to the open position.

Other aspects and advantages of the present invention should be clear from embodiments explained in the following description and shown in the attached drawings, from the illustrations shown in these drawings, and from the concept or gist of the present invention disclosed overall in the specification and these drawings.

BRIEF DESCRIPTION OF THE DRAWINGS

FIGS. 8A-8D are schematic diagrams used to describe the coordinated movements of a block of the linearly-movable shaft and the stopper.

FIGS. 9A-9C are schematic diagrams used to describe the coordinated movements of the block of the linearly-movable shaft and the switch lever.

DETAILED DESCRIPTION OF EMBODIMENTS

Embodiments of the present teachings are explained below, with reference to the drawings.

Embodiments

Figure 1:
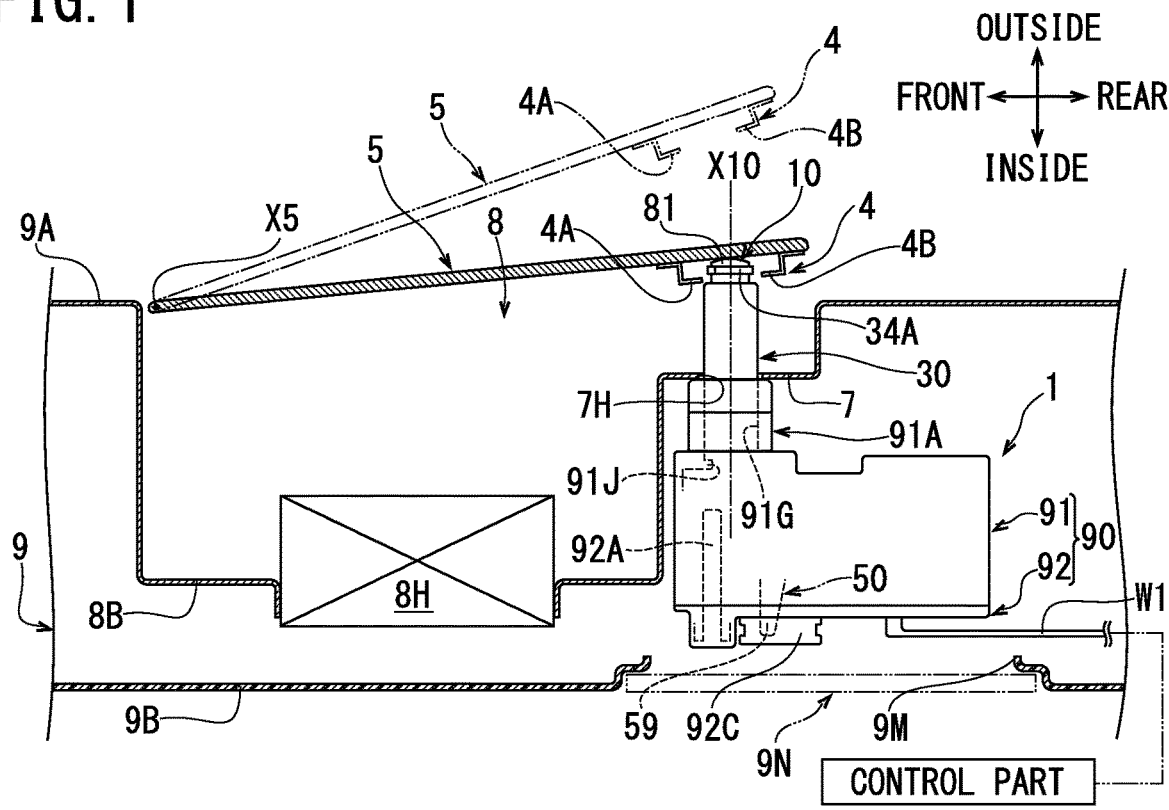
FIG. 1 is a schematic, partial, cross-sectional view of a vehicle that utilizes an apparatus for opening and closing/latching a lid body (fuel door) of a vehicle (hereinafter, lid-body opening/closing apparatus) according to one embodiment of the present teachings and shows the state in which the lid body is in an open position and a linearly-movable shaft is in a first position.
Figure 2:
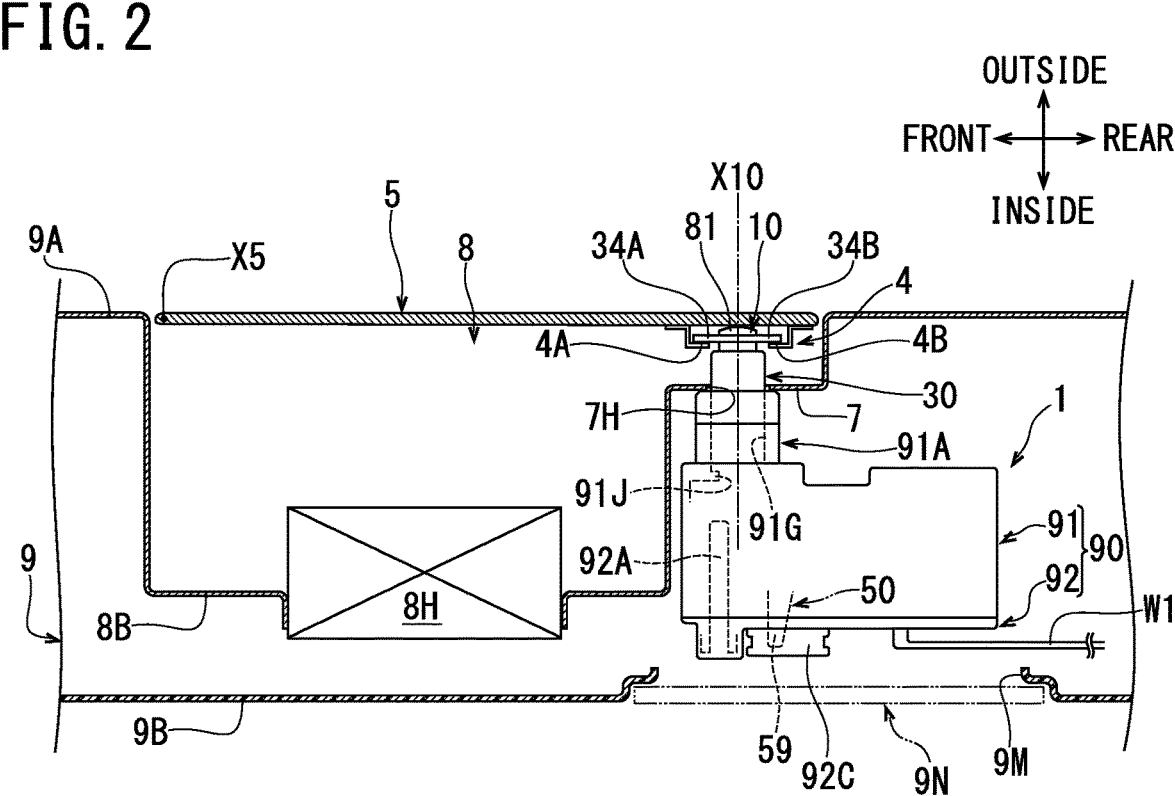
FIG. 2 is a schematic, partial, cross-sectional view of the lid-body opening/closing apparatus, the same as in FIG. 1, and shows the state in which the lid body is in a closed position and the linearly-movable shaft is in a second position.
Figure 3:
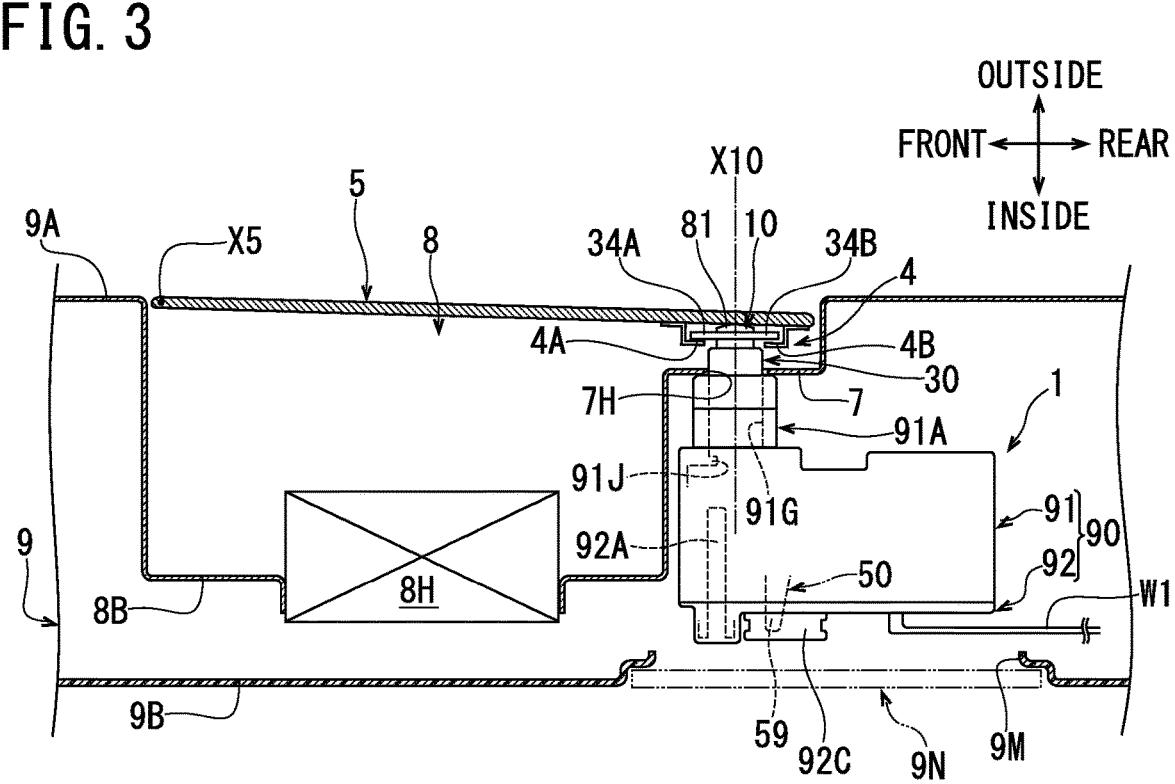
FIG. 3 is a schematic, partial, cross-sectional view of the lid-body opening/closing apparatus, the same as in FIG. 1, and shows the state in which the lid body is in a pressed-in position and the linearly-movable shaft is in a third position.

As shown in FIGS. 1-4, an apparatus for opening and closing a fuel door of a vehicle 1 (hereinafter, simply "lid-body opening/closing apparatus 1") of this working example is one example of a specific embodiment of one representative lid-body opening/closing apparatus of the present teachings. The fuel door of the working example is one example of a "lid" or "lid body" of the present teachings. The lid-body opening/closing apparatus 1 is designed to be utilized in a vehicle such as an automobile, a bus, an industrial vehicle, or the like. FIGS. 1-3 show a rear-side portion on the right-side surface of a vehicle body 9 of the vehicle.

The front and rear directions shown in FIGS. 1-3 are based on the front and rear directions of the vehicle. In addition, the vehicle-inside direction and the vehicle-outside direction shown in FIGS. 1-3 are based on the perspective of a person sitting inside the vehicle cabin, where the right-side surface of the vehicle is the vehicle outer side, and the opposite side is the vehicle inner side, i.e. the cabin side. Furthermore, the direction coming out of the plane of the paper in FIGS. 1-3 is the upper side of the vehicle, i.e. the roof side, whereas the direction going back from the plane of the paper in FIGS. 1-3 is the lower side of the vehicle, i.e. the floor side. The front-rear direction, the vehicle inside-outside direction, and the up-down direction in FIG. 4 and thereafter are shown corresponding to FIGS. 1-3.

Configuration of the Vehicle Opening, Fuel Door (Lid Body), Etc.

As shown in FIG. 1, the vehicle body 9 has a body panel 9A and an inner panel 9B. The body panel 9A constitutes a right-side exterior surface of the vehicle body 9. The inner panel 9B is disposed on the inner side of the vehicle relative to the body panel 9A and partitions off adjacent vehicle compartments such as the trunk.

An opening 8 is provided on the body panel 9A of the vehicle body 9. The opening 8 is a recessed part that is formed such that one portion of the body panel 9A recesses toward the inner side of the vehicle from the right-side surface of the vehicle body 9 and is open toward the right-side surface of the vehicle body 9. The opening 8 has a bottom wall 8B and a support wall 7.

The bottom wall 8B extends substantially planarly in the front-rear direction and the up-down direction, forming the bottom surface of the opening 8. A fuel-filling hole 8H is disposed in the center of the bottom wall 8B. In electric vehicles, the fuel-filling hole 8H is replaced with a charging port.

The support wall 7 extends substantially planarly in the front-rear direction and the up-down direction at a location rearward of the bottom wall 8B and on the vehicle outer side, forming a portion of the inner-wall surface of the opening 8. A through hole 7H is formed so as to pass through the support wall 7. The through hole 7H is a round hole centered on axial center X10. Axial center X10 extends in the vehicle inside-outside direction and passes through the opening 8.

A substantially planar fuel door (hereinafter "lid body") 5 is supported on the body panel 9A of the vehicle body 9 such that it is pivotable about opening/closing axial center X5. Opening/closing axial center X5 extends in the up-down direction along an opening edge on the front side of the opening 8. The lid body 5 is pivotable in a pivot range that includes an open position shown in FIG. 1, a closed position shown in FIG. 2, and a pressed-in position shown in FIG. 3. Although the term "lid body" is utilized herein for the structure 5 that opens and closes the opening 8, other terms may be utilized, such as fuel door, fuel door cover, fuel lid, charging port cover, charging port door, charging port lid, etc. All of these terms are intended to be synonymous. For example and without limitation, it is noted that the term "fuel door" is meant to encompass both a lid that is pivotable about a hinge to uncover a liquid fuel opening and a lid that is pivotable about a hinge to uncover a charging port.

FIG. 1 shows, in solid line and chain double-dashed line, respectively, two exemplary open positions of the lid body 5. By pivoting to an open position, the lid body 5 is displaced (moved) to a position where its rearward end is disposed farther outward of the vehicle than the outer surface of the body panel 9A, thus opening the opening 8.

As shown in FIG. 2, by pivoting to the closed position, the outer surface of the lid body 5 is flush with the outer surface of the body panel 9A, thus constituting a portion of the design surface of the vehicle body 9, and also closing the opening 8.

As shown in FIG. 3, by pivoting to the pressed-in position, the lid body 5 is displaced (moved, pivoted) such that its rearward end is disposed farther toward the inner side of the vehicle than the outer surface of the body panel 9A, and is thus pressed inwardly of the body panel 9A on the side opposite the open position.

As shown in FIG. 2, a lid-body latching part 4, which includes a pair of latching flanges 4A, 4B, is fixed on the surface of the lid body 5 on the rearward end portion that faces the inner side of the vehicle. The front latching flange 4A and the rear latching flange 4B each protrude toward the inner side of the vehicle and then bend, extending so as to approach each other in the front-rear direction.

The tip of the front latching flange 4A and the tip of the rear latching flange 4B oppose one other with a prescribed spacing between them in the front-rear direction. When the lid body 5 is in the closed position, axial center X10 passes through an intermediate position between the tip of the front latching flange 4A and the tip of the rear latching flange 4B.

A maintenance opening 9M and an opening cover 9N are provided in/on the inner panel 9B of the vehicle body 9. The maintenance opening 9M is formed in the inner panel 9B rearward of the fuel-filling hole 8H. The maintenance opening 9M passes through the inner panel 9B and is sized such that the lid-body opening/closing apparatus 1 can pass through the maintenance opening 9M.

The opening cover 9N is removably mounted on the inner panel 9B, thereby closing the maintenance opening 9M. The opening cover 9N is removable, e.g., by an assembler at the time of attaching the lid-body opening/closing apparatus 1 during the manufacture of the vehicle or by a mechanic when performing work on the lid-body opening/closing apparatus 1 such as maintenance or repair work. Thereby, it is possible to perform the above-described work easily by inserting a hand into the space between the body panel 9A and the inner panel 9B via the opened maintenance opening 9M.

Configuration of the Lid-Body Opening/Closing Apparatus

Figure 4:
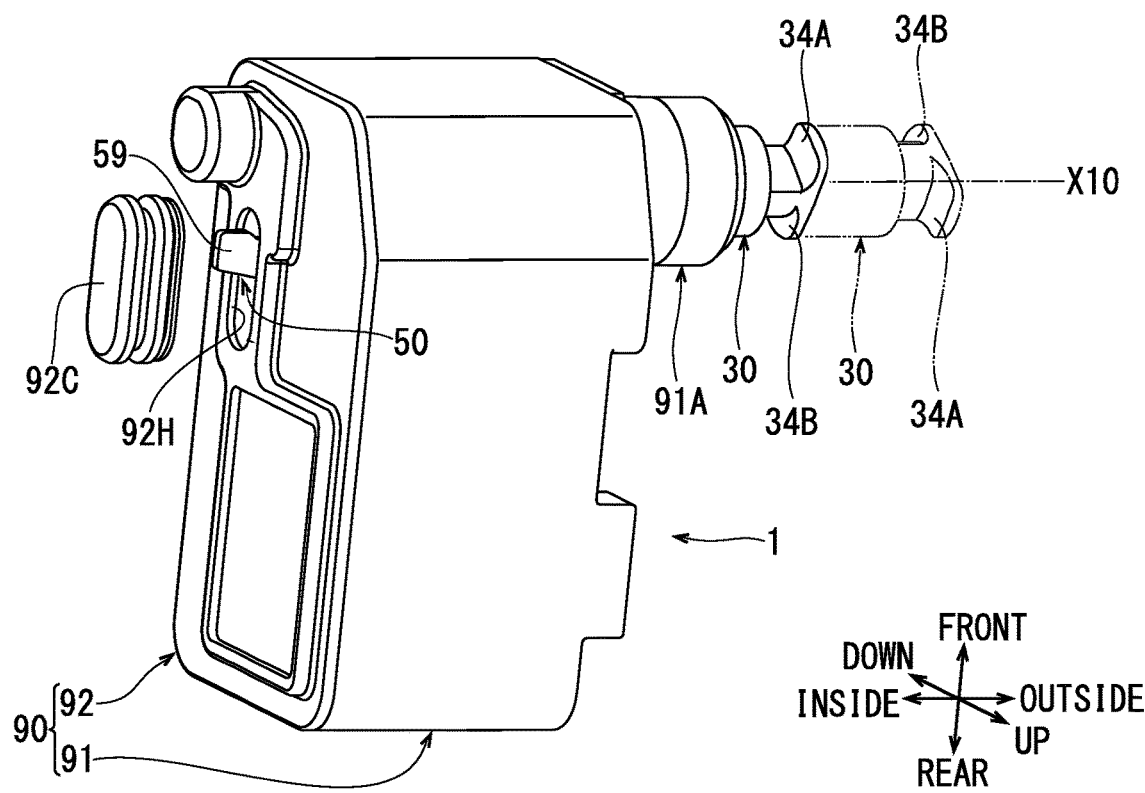
FIG. 4 is an oblique view of the lid-body opening/closing apparatus according to the embodiment.
Figure 5:
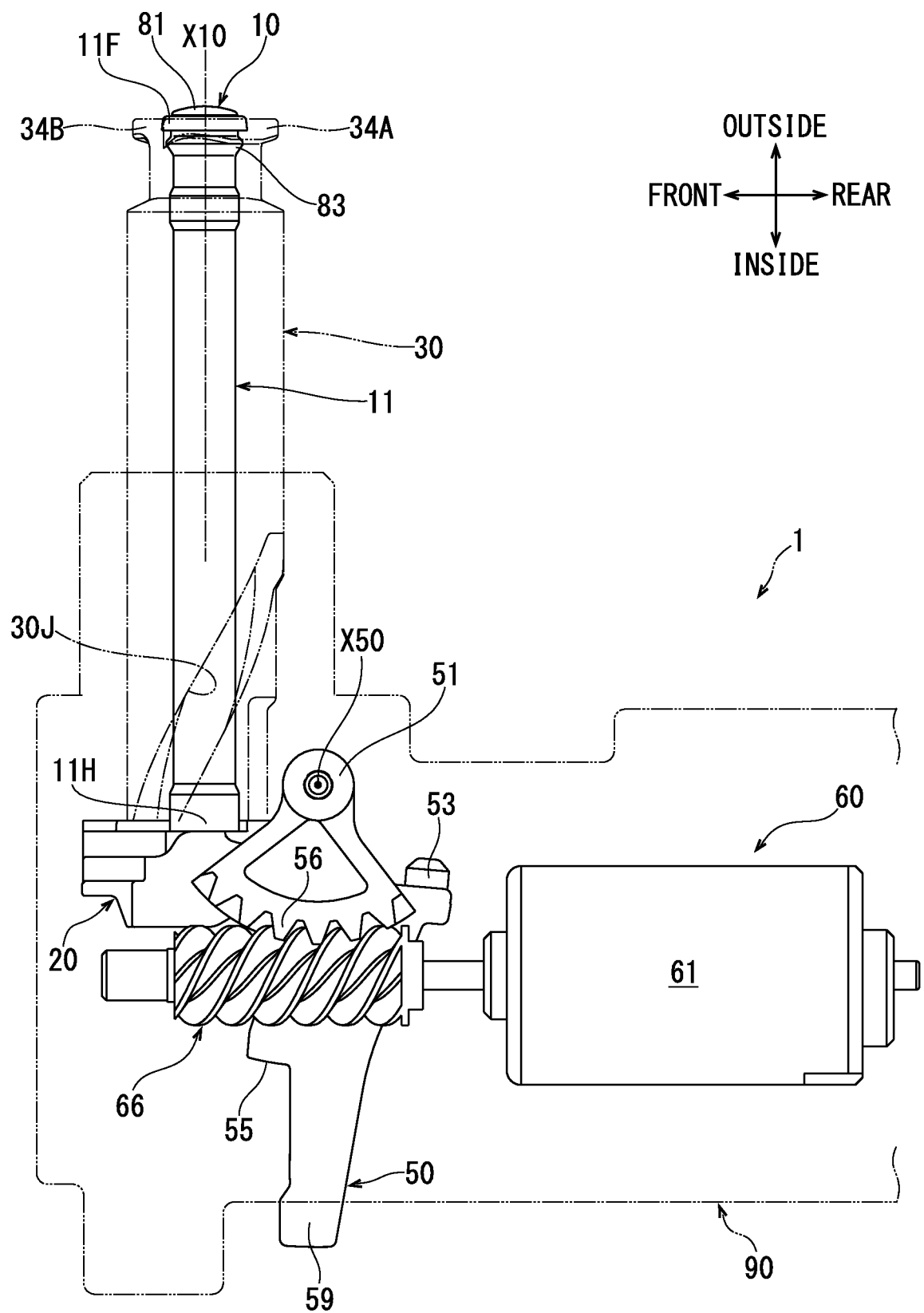
FIG. 5 is a top view showing the positional relationships among the linearly-movable shaft, a rotary shaft, a stopper, and an electric actuator.
Figure 6:
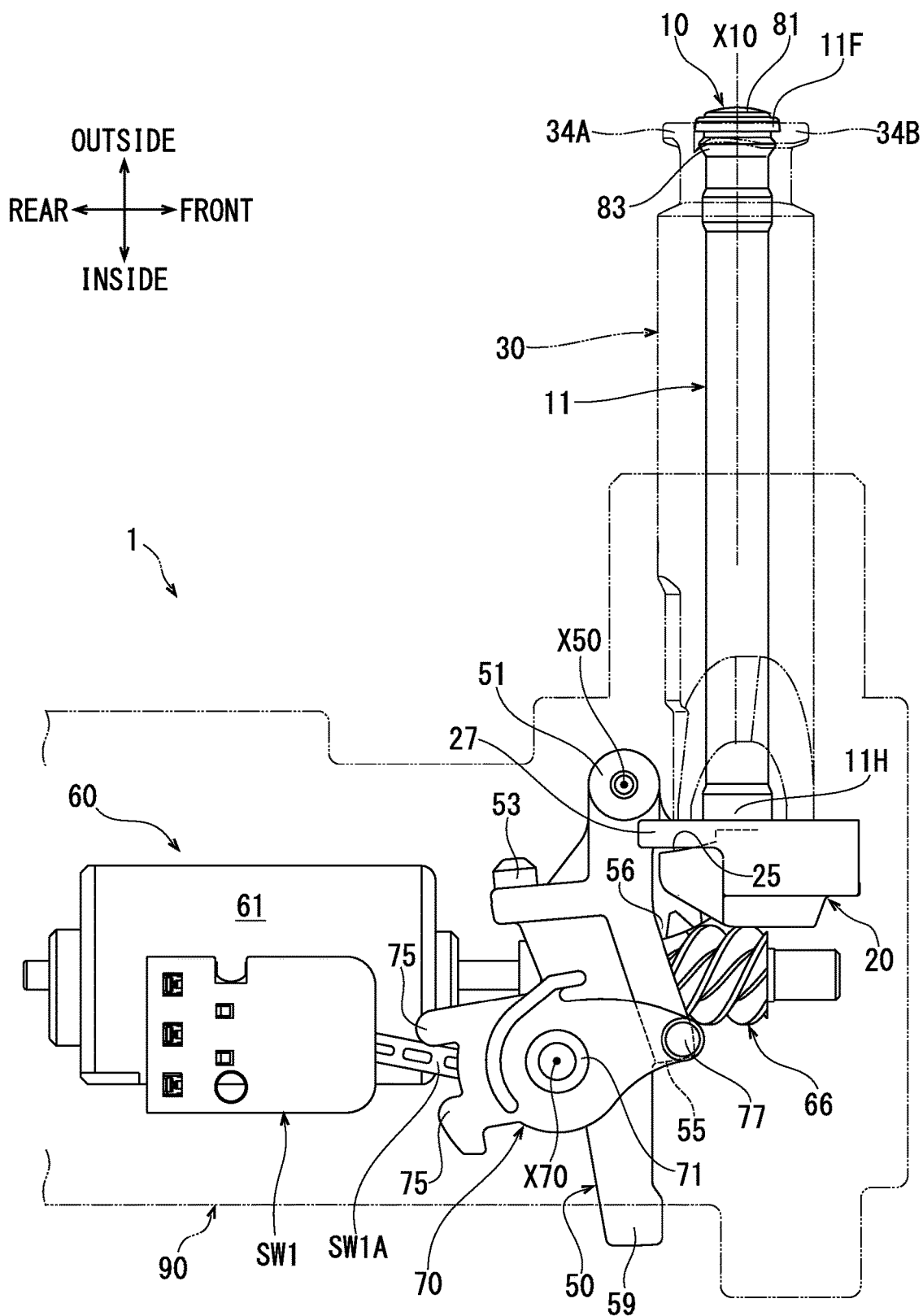
FIG. 6 is a bottom view showing the positional relationships among the linearly-movable shaft, the rotary shaft, the stopper, the electric actuator, a switch lever, and a switch.
Figure 7:
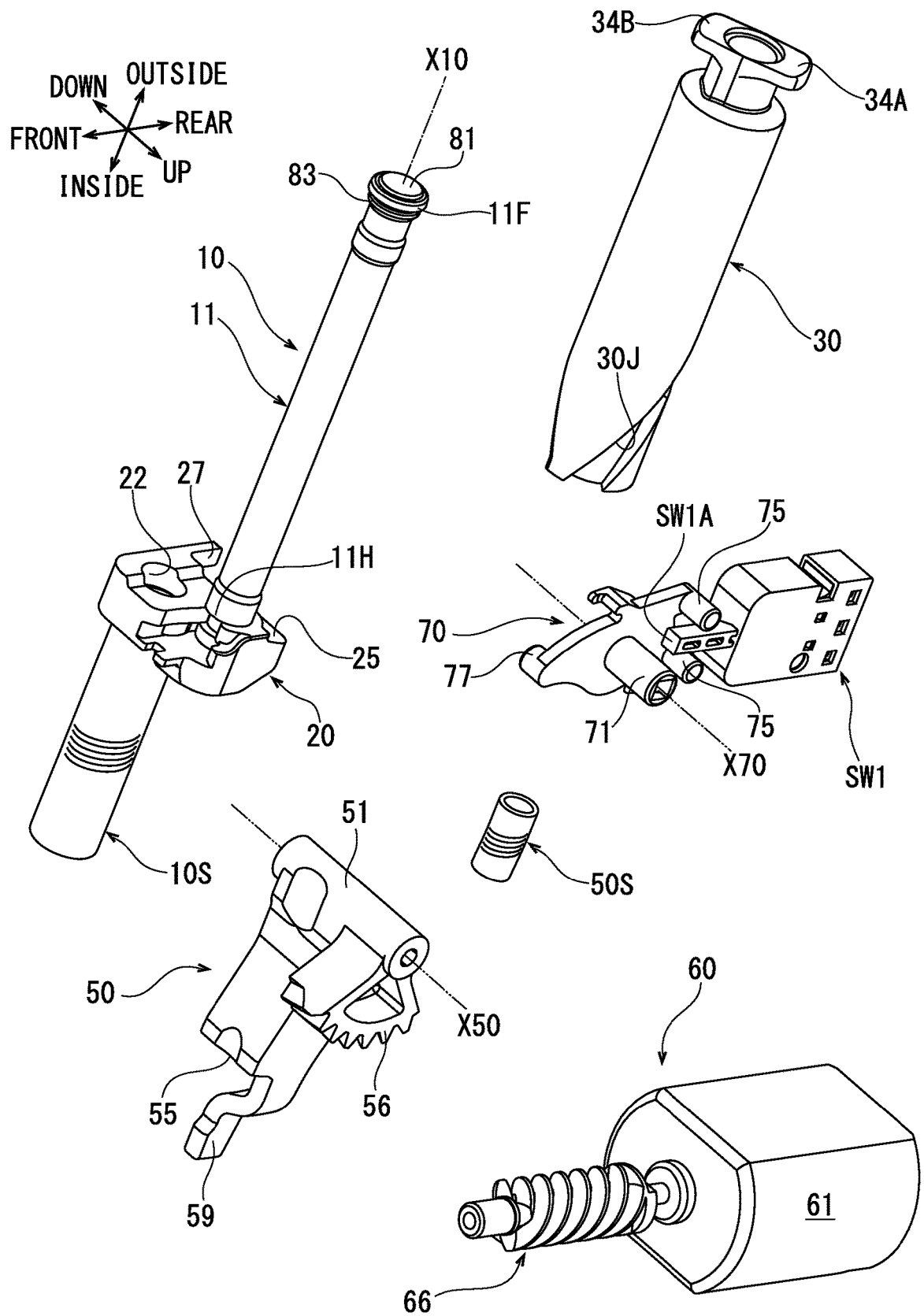
FIG. 7 is an exploded oblique view of the linearly-movable shaft, the rotary shaft, the stopper, the electric actuator, the switch lever, and the switch.

As shown in FIGS. 1-3, the lid-body opening/closing apparatus 1 is provided between the opening 8 and the lid body 5 and is configured/adapted for opening and closing the lid body 5. The lid-body opening/closing apparatus 1 comprises a housing 90 as shown in FIGS. 1-4, a linearly-movable shaft 10 as shown in FIGS. 5-9, a rotary shaft 30 as shown in FIGS. 1-7, a compression-coil spring 10S as shown in FIG. 7, a stopper 50 as shown in FIGS. 5-8, and a compression-coil spring 50S as shown in FIG. 7. In addition, the lid-body opening/closing apparatus 1 comprises an electric actuator 60 as shown in FIGS. 5-7, and a switch lever 70 and a switch SW1 as shown in FIGS. 6, 7, and 9.

Housing

As shown in FIG. 1, the housing 90 is provided on the vehicle body 9 by being fastened to fixing members (not shown) disposed between the body panel 9A and the inner panel 9B of the vehicle body 9. As shown in FIGS. 1 and 4, the housing 90 includes a housing body 91 and a housing case (housing cover) 92.

The housing body 91 is a substantially box-shaped body having an open side on the surface that faces the inner side of the vehicle. A tubular guide 91A is formed on a front portion of the surface of the housing body 91 facing the outer side of the vehicle. The tubular guide 91A has a circular-tube shape centered on axial center X10 and protrudes toward the outer side of the vehicle.

As shown in FIG. 1, the inner-circumferential surface of the tubular guide 91A serves as a guide surface 91G for enabling the linearly-movable shaft 10 and the rotary shaft 30 to undergo linear reciprocating motion in the direction of axial center X10. In addition, a guide protrusion 91J is formed on the inner side of the housing body 91 and enables the rotary shaft 30 to be rotatable around axial center X10.

As shown in FIGS. 1 and 4, the housing case 92 is assembled (mounted) on the open side of the housing body 91 having the surface that faces the inner side of the vehicle. The housing case 92, together with the housing body 91, partitions off (encloses) a storage space of (within) the housing 90.

Stored within the storage space of the housing 90 are: a portion of each of the linearly-movable shaft 10 and the rotary shaft 30, as well as the compression-coil spring 10S, the stopper 50, the compression-coil spring 50S, the electric actuator 60, the switch lever 70, and the switch SW1.

As shown in FIG. 1, a shaft-shaped guide 92A is formed on (extends from) the front portion of the housing case 92 and enables the linearly-movable shaft 10 to undergo linear reciprocating motion in the direction of axial center X10. The shaft-shaped guide 92A has a circular-cylindrical shaft shape centered on an axial center that extends in parallel to axial center X10, i.e. the axial center of the shaft-shaped guide 92A is offset relative to axial center X10. Furthermore, the shaft-shaped guide 92A protrudes within the housing 90 toward the outer side of the vehicle.

Although omitted from FIGS. 1-3, the compression-coil spring 10S shown in FIG. 7 is mounted around the shaft-shaped guide 92A. In addition, although omitted from the figures, holding (support) parts are formed on the housing case 92 to respectively hold (support) the stopper 50, the compression-coil spring 50S, the electric actuator 60, the switch lever 70, and the switch SW1, which are shown in FIG. 7, together with the housing body 91.

As shown in FIG. 4, a slot 92H extending in the front-rear direction is formed in the housing case 92 such that it passes through in the vehicle inside-outside direction. The slot 92H is covered by a rubber cap 92C as shown in FIGS. 1 and 4.

Linearly-Movable Shaft and Rotary Shaft

As shown in FIGS. 5-7, the linearly-movable shaft 10 comprises a linearly-movable-shaft main body 11 and a block (which may also be called a hook block or an actuator/engagement flange) 20.

The linearly-movable-shaft main body 11 is a substantially circular-cylindrical shaft that extends centered on axial center X10. The linearly-movable-shaft main body 11 includes a base-end portion 11H, which is one end portion of the linearly-movable-shaft main body 11 that is located on the side opposite to the lid body 5 in the direction of axial center X10, i.e. on the inner side of the vehicle. A terminal end of the linearly-movable-shaft main body 11 is the other end portion of the linearly-movable-shaft main body 11 that is located on the lid body 5 side in the direction of axial center X10, i.e. toward the outer side of the vehicle.

A flange part 11F is formed on (at) the terminal end portion of the linearly-movable-shaft main body 11. The flange part 11F protrudes outward in the radial direction of axial center X10 more than other portions of the linearly-movable-shaft main body 11.

In addition, a cushioning part 81 and a sealing part 83 are provided on the terminal end (tip) of the linearly-movable-shaft main body 11. The cushioning part 81 and the sealing part 83 are made of elastic materials, for example, rubber, elastomers, soft resins, or the like, that are softer (more elastic) than the polymer (resin) materials constituting the other (rigid) portions of the linearly-movable-shaft main body 11.

The cushioning part 81 protrudes toward the outer side of the vehicle from the flange part 11F, i.e. toward the lid body 5. The sealing part 83 is formed in a ring shape around axial center X10 toward the inner side of the vehicle from the flange part 11F.

The block 20 is a substantially block-shaped member made of polymer (resin) that is fixed to the base-end portion 11H of the linearly-movable-shaft main body 11 and that is moveable integrally with the linearly-movable-shaft main body 11. As shown in FIG. 7, a shaft-shaped guide insertion hole 22, an engagement part 25, and an actuating part 27 are formed in/on the block 20.

The shaft-shaped guide insertion hole 22 is a round hole that passes, in a direction parallel to axial center X10, through a portion of the block 20 that is offset downward and forward of the linearly-movable-shaft main body 11.

Although omitted from the figures, by inserting the shaft-shaped guide 92A shown in FIG. 1 through the shaft-shaped guide insertion hole 22, the linearly-movable shaft 10 is supported by the housing 90 such that it can undergo linear reciprocating motion in (along) the direction of axial center X10.

In addition, because the shaft-shaped guide insertion hole 22 and the shaft-shaped guide 92A are offset relative to axial center X10 (i.e. offset relative to the tubular guide 91A, in which the linearly-movable shaft 10 and the rotary shaft 30 are inserted), the linearly-movable shaft 10 is supported by the housing 90 such that it is nonrotatable around axial center X10.

When the shaft-shaped guide 92A shown in FIG. 1 is inserted through the shaft-shaped guide insertion hole 22, one end of the compression-coil spring 10S makes contact with the block 20, as shown in FIG. 7. Thereby, the compression-coil spring 10S biases the linearly-movable shaft 10 toward the outer side of the vehicle.

As shown in FIGS. 7 and 8, the engagement part 25 is a tilted surface that faces the outer side of the vehicle and is formed on a portion of the block 20 that is offset rearward from the linearly-movable-shaft main body 11. The engagement part 25 is tilted such that it inclines toward the inner side of the vehicle as it extends in the rearward direction.

As shown in FIGS. 7 and 9, the actuating part 27 is a protruding part (protrusion) that protrudes rearward from a portion of the block 20 that is offset downward from the linearly-movable-shaft main body 11.

As shown in FIG. 7, the rotary shaft 30 is a polymer (resin) member that extends in a substantially circular-tube shape centered on axial center X10. A helical groove 30J is defined as a recess or slot in an outer-circumferential surface of the rotary shaft 30. The helical groove 30J extends in a helical shape, centered on axial center X10.

The terminal end (tip) of the rotary shaft 30 is an end part of the rotary shaft 30 located on the lid body 5 side of the rotary shaft 30 in the direction of axial center X10, i.e. toward the outer side of the vehicle, and has a diameter smaller than the other portions of the rotary shaft 30. Latch protrusions 34A, 34B are formed on (at) the terminal end portion of the rotary shaft 30. The latch protrusions 34A, 34B are substantially plate-shaped protrusions that protrude, from the terminal end portion of the rotary shaft 30, outward in the radial direction of axial center X10 such that they are spaced apart from one other.

As shown in FIGS. 5 and 6, when the linearly-movable-shaft main body 11 is inserted through the rotary shaft 30, the linearly-movable-shaft main body 11 supports the rotary shaft 30 such that it is rotatable around axial center X10. Because the flange part 11F of the linearly-movable-shaft main body 11 and the block 20 sandwich the rotary shaft 30 in the vehicle inside-outside direction, the rotary shaft 30 is kept (blocked) from falling out of the linearly-movable-shaft main body 11. Because the ring-shaped sealing part 83 of the linearly-movable-shaft main body 11 makes contact with the interior of the rotary shaft 30, the gap between the linearly-movable-shaft main body 11 and the rotary shaft 30 is sealed, thereby inhibiting (blocking) the ingress of foreign matter into the housing 90 via this gap.

As shown in FIGS. 1-3, the rotary shaft 30 is inserted through the interior of the tubular guide 91A of the housing 90 with the rotary shaft 30 mounted around the linearly-movable shaft 10. Although not shown in the figures, the guide protrusion 91J of the housing 90 projects into the helical groove 30J of the rotary shaft 30.

Because the outer-circumferential surface of the rotary shaft 30 is guided along (by) the guide surface 91G of the tubular guide 91A, the linearly-movable shaft 10 and the rotary shaft 30 are supported by the housing 90 such that they can undergo linear reciprocating motion in the direction of axial center X10.

Furthermore, as was described above, the linearly-movable shaft 10 is supported on the housing 90 by the shaft-shaped guide insertion hole 22 and the shaft-shaped guide 92A such that it can undergo linear reciprocating motion in the direction of axial center X10, but it is nonrotatable around axial center X10.

On the other hand, because the rotary shaft 30 is rotatably supported by the linearly-movable-shaft main body 11 and the guide protrusion 91J protrudes into the helical groove 30J, the rotary shaft 30 can undergo linear reciprocating motion in the direction of axial center X10 together with the linearly-movable shaft 10 and also the rotary shaft 30 is supported on the housing 90 such that it is rotatable around axial center X10.

Therefore, the linearly-movable shaft 10 is reciprocally movable in a linear range that includes a first position shown in FIG. 1, a second position shown in FIG. 2, and a third position shown in FIG. 3.

As shown in FIG. 1, the first position of the linearly-movable shaft 10 corresponds to an open position of the lid body 5. When the linearly-movable shaft 10 is disposed in the first position, it protrudes outward from the outermost surface of the vehicle body (i.e. the outermost surface of the body panel 9A). The linearly-movable shaft 10 is also shown in the first position in FIGS. 5, 6, 8A, and 9A.

As shown in FIG. 2, the second position of the linearly-movable shaft 10 corresponds to the closed position of the lid body 5. When the linearly-movable shaft 10 is disposed in the second position, it has retracted toward the inner side of the vehicle, with the terminal end (tip) of the linearly-movable shaft 10 entering between the latching flanges 4A, 4B of the lid-body latching part 4. This causes the cushioning part 81 to make contact with the surface of the lid body 5 that faces the inner side of the vehicle, which is in the closed position. The linearly-movable shaft 10 is also shown in the second position in FIGS. 8D and 9B.

As shown in FIG. 3, the third position of the linearly-movable shaft 10 corresponds to the pressed-in position of the lid body 5. When the linearly-movable shaft 10 is disposed in the third position, the cushioning part 81, which is located at the terminal end (tip) of the linearly-movable shaft 10, remains in contact with the surface of the lid body 5 that faces the inner side of the vehicle, which is in the pressed-in position, while retracting even deeper toward the inside of the opening 8 than in the second position. The linearly-movable shaft 10 is also shown in the third position in FIGS. 8C and 9C.

The linearly-movable shaft 10 is biased (urged) in the vehicle outward direction by the compression-coil spring 10S shown in FIG. 7 toward the first position shown in FIG. 1.

When the linearly-movable shaft 10 is moved to the second position or the third position, the rotary shaft 30 is simultaneously rotated to the latched position shown in FIGS. 2 and 3 owing to the interaction between the guide protrusion 91J of the housing 90 and the helical groove 30J of the rotary shaft 30. When the rotary shaft 30 is in the latched position, the latch protrusion 34A protrudes forward and latches the latching flange 4A of the lid-body latching part 4, and the latch protrusion 34B protrudes rearward and latches the latching flange 4B of the lid-body latching part 4. Thus, when the rotary shaft 30 is in the latched position, the lid body 5 is latched in the closed position or the pressed-in position. The rotary shaft 30 is also shown in the latched position by solid lines in FIG. 4.

On the other hand, when the linearly-movable shaft 10 is moved to the first position, the rotary shaft 30 is simultaneously rotated to the unlatched position shown in FIG. 1 owing to the interaction between the guide protrusion 91J of the housing 90 and the helical groove 30J of the rotary shaft 30. When the rotary shaft 30 is in the unlatched position, the latch protrusion 34A is caused to protrude upward and be spaced apart from the latching flange 4A of the lid-body latching part 4. Furthermore, although not shown, the latch protrusion 34B is caused to protrude downward and be spaced apart from the latching flange 4B of the lid-body latching part 4. Thus, when the rotary shaft 30 is in the unlatched position, the lid body 5 is no longer latched. The rotary shaft 30 is also shown in the unlatched position by chain double-dashed lines in FIGS. 4 and 6.

Stopper

As shown in FIGS. 5-8, the stopper 50 is a polymer (resin) member that includes a pivot-axis part 51, a fan-shaped (arcuate) gear 56, a stopper surface (engagement surface) 55, a manual-operation part (tab) 59, and a spring-seat part 53 that are all integrally formed as a single component, i.e. the stopper 50.

The pivot-axis part 51 is supported by the housing 90 such that the stopper 50 is pivotable about pivot-axis center X50 that extends in the up-down direction.

Gear teeth are formed on the fan-shaped gear 56 and extend along an arc of a fan-shaped portion that protrudes from an upper portion of the pivot-axis part 51 toward the inner side of the vehicle.

The stopper surface 55 is formed on a substantially block-shaped portion that protrudes from a lower portion of the pivot-axis part 51 toward the inner side of the vehicle. The stopper surface 55 is a curved surface that faces the inner side of the vehicle while curving such that it traces an arc centered on pivot-axis center X50.

The manual-operation part 59 is connected to a region shifted upward and rearward of the stopper surface 55 on the substantially block-shaped portion protruding from the lower portion of the pivot-axis part 51 toward the inner side of the vehicle. The manual-operation part 59 extends toward the inner side of the vehicle while curving in a crank shape.

As shown in FIG. 4, the terminal end (tip) of the manual-operation part 59 passes through the slot 92H of the housing case 92, protrudes outside of the housing 90, and is covered by the rubber cap 92C as shown in FIG. 1. When the user moves the manual-operation part 59 by pushing on the rubber cap 92C, it becomes possible to manually pivot the stopper 50. That is, the manual-operation part 59 is provided such that it is operable (manually pushable) from the outside of the housing 90.

As shown in FIGS. 5-8, the spring-seat part 53 is formed at a position that is rearward of the pivot-axis part 51 and is spaced apart toward the inner side of the vehicle. The spring-seat part 53 protrudes toward the outer side of the vehicle. The spring-seat part 53 latches in the end part of the compression-coil spring 50S (FIG. 7) that is on the inner side of the vehicle. The compression-coil spring 50S biases the stopper 50 in the direction of displacing (pivoting) the stopper surface 55 forward.

The stopper 50 is pivotable in a range that includes (between) a blocking position shown by solid lines in FIG. 8D and a nonblocking position shown by chain double-dashed lines in FIG. 8D.

When the stopper 50 is in the blocking position shown by solid lines in FIG. 8D, the stopper surface 55 engages (contacts) the engagement part 25 formed on the block 20 of the linearly-movable shaft 10 in the second position, thereby prohibiting (blocking) the linearly-movable shaft 10 from moving from the second position to the first position. The stopper 50 is also shown in the blocking position in FIGS. 5, 6, 8A, and 8C.

When the stopper 50 is in the nonblocking position shown by chain double-dashed lines in FIG. 8D, the stopper surface 55 is separated (spaced part) from the engagement part 25 formed on the block 20 of the linearly-movable shaft 10 in the second position, thereby permitting the linearly-movable shaft 10 to move from the second position to the first position. The stopper 50 is also shown in the nonblocking position in FIG. 8B.

The stopper 50 is biased toward the blocking position by the compression-coil spring 50S shown in FIG. 7.

Electric Actuator

As shown in FIGS. 5-7, the electric actuator 60 comprises an electric motor 61 and a worm gear 66, which are housed inside the housing 90. The electric motor 61 is electrically connected, via a wire harness W1 shown in FIG. 1, to a control part (FIG. 1) installed inside the vehicle, e.g., to an electronic control unit (ECU) or other type of processor/controller. As shown in FIG. 5, the worm gear 66 is connected to a drive shaft of the electric motor 61 so as to be rotatable therewith. The worm gear 66 meshes with the fan-shaped gear 56 of the stopper 50.

When the electric motor 61 is energized by the control part, the electric actuator 60 transmits the driving force of the electric motor 61 to the stopper 50 via the (rotating) worm gear 66 and the fan-shaped gear 56 and thereby pivots the stopper 50, against the biasing force of the compression-coil spring 50S shown in FIG. 7, from the blocking position shown in solid lines in FIG. 8D to the nonblocking position shown in chain double-dashed lines in FIG. 8D.

On the other hand, when the electric motor 61 is no longer energized, the holding force will no longer act on the worm gear 66, and therefore the electric actuator 60 will permit the stopper 50 to return to the blocking position owing to the biasing force of the compression-coil spring 50S shown in FIG. 7.

Switch Lever and Switch

As shown in FIGS. 6, 7, and 9, the switch lever 70 and the switch SW1 are disposed inside the housing 90 downward of the electric motor 61 and the worm gear 66.

The switch lever 70 is a polymer (resin) member that includes a pivot-axis part 71, a driven part 77, and a switching part 75, which are integrally formed together as a single component. The pivot-axis part 71 is supported by the housing 90 such that the switch lever 70 is pivotable around pivot-axis center X70 that extends in the up-down direction.

As shown in FIG. 7, the driven part 77 is a circular-cylindrical shaft that protrudes downward from the terminal end (tip) of a plate-shaped part, which terminal end (tip) extends forward from the pivot-axis part 71. The switching part 75 is composed of two circular-cylindrical shafts that are spaced apart from one another in the vehicle inside-outside direction. The two circular-cylindrical shafts respectively protrude upward from two locations on a portion of the plate-shaped part that is rearward of the pivot-axis part 71.

The switch lever 70 is biased (urged) by a torsion coil spring (not shown) toward (in) the counterclockwise direction in the plane of the paper in FIG. 6 and FIGS. 9A-9C around pivot-axis center X70.

As shown in FIG. 7, the switch SW1 comprises a movable protrusion (lever) SW1A. The movable protrusion SW1A protrudes forward from a front surface of the switch SW1 and is sandwiched (interleaved) between the two circular-cylindrical shafts of the switching part 75 in the vehicle inside-outside direction.

When the switching part 75 of the pivoting switch lever 70 pushes the movable protrusion SW1A in the vehicle inside-outside direction and thereby displaces the movable protrusion SW1A in the vehicle inside-outside direction, the switch SW1 switches between a disconnected state and a connected state, i.e. changes its connection state. The same as with the electric motor 61, the switch SW1 is electrically connected by the wire harness W1 shown in FIG. 1 to the control part.

The control part ascertains whether the switch SW1 has been switched to the disconnected state or the connected state, and as needed, utilizes information from other switches, sensors, or the like, to determine whether a manual opening operation or a manual closing operation (further described below) has been performed by the user on the lid body 5, and also stores the state (disconnected or connected) of the switch SW1.

For the following description, E1 will be defined as the entire linear reciprocating motion range of the linearly-movable shaft 10 between the first position shown in FIG. 9A and the third position shown in FIG. 9C.

As shown in FIG. 9A, range E1 is divided into specific range (engaged range or driven range) E2, over which the driven part 77 of the switch lever 70 engages with the actuating part 27 formed on the block 20 of the linearly-movable shaft 10, and separation range (spaced apart range) E3 over which the driven part 77 is separated (spaced apart) from the actuating part 27.

When the linearly-movable shaft 10 is in the first position shown in FIG. 9A, the actuating part 27 of the linearly-movable shaft 10 is most spaced apart from the driven part 77 of the switch lever 70. At this time, the switch SW1 changes to (assumes) the disconnected state because the switch lever 70 is biased by the torsion coil spring (not shown), thereby causing the movable protrusion SW1A to be displaced toward the inner side of the vehicle. It is noted that, in the present working example, the switch SW1 functions by disconnecting and connecting a single current path. However, the present invention is not limited to this configuration. Instead, for example, the switch SW1 may be configured/adapted such that, when the movable protrusion SW1A has been displaced toward the inner side of the vehicle, the switch SW1 may put a different current path into the connected state.

As the linearly-movable shaft 10 displaces from the first position to the second position shown in FIG. 9B, the actuating part 27 approaches the driven part 77. Then, when linearly-movable shaft 10 transitions from separation range E3 to specific range E2, the actuating part 27 makes contact with the driven part 77. Because the torsion coil spring (not shown) biases the switch lever 70 counterclockwise, such that the driven part 77 is moved toward the outer side of the vehicle, the driven part 77 is pressed against the actuating part 27 in specific range E2. Consequently, in specific range E2, the driven part 77 of the switch lever 70 engages with the actuating part 27 of the linearly-movable shaft 10, and the switch lever 70 interacts with the linearly-movable shaft 10.

Then, when the linearly-movable shaft 10 passes the second position and is displaced toward the third position shown in FIG. 9C, the switch lever 70, which is interacting with the linearly-movable shaft 10, pivots in the clockwise direction of FIG. 9 against the biasing force of the torsion coil spring (not shown), thereby causing the movable protrusion SW1A to be slightly displaced toward the outer side of the vehicle.

Then, when the linearly-movable shaft 10 reaches the third position, because the switch lever 70 is displacing the movable protrusion SW1A farther toward the outer side of the vehicle, the switch SW1 switches from the disconnected state to the connected state.

On the other hand, when the linearly-movable shaft 10 displaces from the third position to the first position, because the switch lever 70, which is interacting with the linearly-movable shaft 10 in specific range E2, is pivoted in the counterclockwise direction of FIG. 9 by the biasing force of the torsion coil spring (not shown), the switch SW1 switches from the connected state to the disconnected state.

Then, when the linearly-movable shaft 10 passes the second position and transitions from specific range E2 to separation range E3, the actuating part 27 separates from the driven part 77. As a result, in separation range E3, the driven part 77 of the switch lever 70 no longer engages with the actuating part 27 of the linearly-movable shaft 10, and the switch lever 70 no longer interacts with the linearly-movable shaft 10.

Lid-Body Opening/Closing Actions

The lid-body opening/closing apparatus 1 having the above-described configuration opens and closes the lid body 5 as described below. The following explanation will begin starting from the state in which the lid body 5 is in the first position, where the opening 8 is open, as shown by the chain double-dashed lines in FIG. 1.

In this state, based on information from the switch SW1 and the like, the control part records (stores in memory) that the status is after the user has performed a manual opening operation.

If the user then pushes in the lid body 5 shown by chain double-dashed lines in FIG. 1 toward the inner side of the vehicle to the state (position) indicated by solid lines in FIG. 1, then the terminal end (tip) of the linearly-movable shaft 10 in the first position and the terminal end (tip) of the rotary shaft 30 in the unlatched position enter into the lid-body latching part 4 of the lid body 5, and the cushioning part 81 of the linearly-movable shaft 10 makes contact with the surface of the lid body 5 that faces the inner side of the vehicle, thus absorbing the impact.

If the user then further pushes the lid body 5 against the biasing force of the compression-coil spring 10S toward the inner side of the vehicle, the lid body 5 will pass the closed position shown in FIG. 2 and reach the pressed-in position shown in FIG. 3. At this time, the linearly-movable shaft 10 passes the second position and reaches the third position. The rotary shaft 30 moves linearly together with the linearly-movable shaft 10 while rotating from the unlatched position to the latched position, thus latching the latch protrusions 34A, 34B to the lid-body latching part 4 and thereby latching the lid body 5.

In addition, at this time, as shown in FIG. 8B, the stopper 50 is pushed in the rearward direction by a rear-end surface of the block 20 of the linearly-movable shaft 10 and thereby pivots from the blocking position to the nonblocking position against the biasing force of the compression-coil spring 50S. Therefore, the linearly-movable shaft 10 is permitted to pass through the second position to the third position.

Then, as shown in FIG. 8C, after the linearly-movable shaft 10 has passed the second position and approaches the third position, the stopper 50 is pivoted back to the blocking position by the biasing force of the compression-coil spring 50S. At this time, the stopper surface 55 opposes, from the outer side of the vehicle, the engagement part 25 of the linearly-movable shaft 10, with a gap between them as shown in FIG. 8C.

Thereafter, when the user takes their hand off the lid body 5, the linearly-movable shaft 10 displaces from the third position back to the second position owing to the biasing force of the compression-coil spring 10S as shown in solid lines in FIG. 8D. Then, because the stopper surface 55 of the stopper 50 is disposed in the blocking position where it engages with (blocks movement of) the engagement part 25 of the linearly-movable shaft 10, the linearly-movable shaft 10 is held at the second position.

During the time period while the user is performing the above-described manual closing operation to close the lid body 5 as described above, as shown in FIGS. 9A and 9B, when the linearly-movable shaft 10, which is in separation range E3, causes the actuating part 27 to approach the driven part 77 and transitions from separation range E3 to specific range E2, the driven part 77 engages with the actuating part 27. Furthermore, in specific range E2, the switch lever 70 interacts with the linearly-movable shaft 10. Therefore, as shown in FIG. 9C, when the linearly-movable shaft 10 has displaced to the third position, the switch SW1 is switched to the connected state.

Based on the record (stored status) that the status is after the user has performed a manual opening operation, the control part determines that the switching of the switch SW1 from the disconnected state to the connected state is associated with a manual closing operation being performed by the user, and determines that there is no need to energize the electric motor 61 of the electric actuator 60.

Thereafter, when the user taking their hand off the lid body 5, the switch lever 70 continues to interacts with the linearly-movable shaft 10 while the linearly-movable shaft 10 displaces from the third position to the second position shown in FIG. 9B, thereby causing the switch SW1 to be switched to the disconnected state.

The control part determines that the switching of the switch SW1 from the connected state to the disconnected state is associated with the completion of the manual closing operation performed by the user and records (stores) this fact (status).

To pivot the lid body 5 held at the closed position shown in FIG. 2 to the open position shown in FIG. 1, the user performs a manual opening operation by pressing in the lid body 5 from the closed position to the pressed-in position shown in FIG. 3. Thereby, as shown in FIG. 8C, the linearly-movable shaft 10 moves from the second position and reaches the third position while the stopper 50 remains in the blocking position. At this time, as shown in FIG. 9C, the switch lever 70 continues to interact with the linearly-movable shaft 10 in specific range E2 while the linearly-movable shaft 10 displaces (moves) from the second position to the third position, thereby causing the switch SW1 to be switched to the connected state.

If the control part ascertains that the switch SW1 was changed to the connected state after having recorded that the manual closing operation of the user was completed, then the control part determines that a manual opening operation of the user has been performed. Therefore, owing to the fact that the control part has detected a manual opening operation being performed by the user, the control part energizes the electric motor 61 of the electric actuator 60, which causes the stopper 50 to be pivoted to the nonblocking position shown by chain double-dashed lines in FIG. 8D.

That is, after the lid body 5 has been held in the closed position, the electric actuator 60 is energized as a consequence of the switch SW1 having been put into the connected state, and thus rotation of the worm gear 66 causes the stopper 50 to be pivoted to the nonblocking position.

When the stopper 50 has been pivoted to the nonblocking position (as shown by chain double-dashed lines in FIG. 8D) such that the stopper surface 55 of the stopper 50 is separated (spaced apart) from the engagement part 25 of the linearly-movable shaft 10, the linearly-movable shaft 10 is permitted to pass the second position and displaces to the first position shown in FIG. 8A owing to the biasing force of the compression spring 10S. Consequently, the lid body 5 passes the closed position shown in FIG. 2 and pivots to the open position shown by solid lines in FIG. 1.

At this time, the rotary shaft 30 rotates from the latched position shown in FIG. 2 to the unlatched position shown in FIG. 1 while moving linearly together with the linearly-movable shaft 10. The rotation of the rotary shaft 30 causes the latch protrusions 34A, 34B to separate from the lid-body latching part 4, and thereby the lid body 5 is no longer latched. As a result, the user can pivot the lid body 5 farther to the open position shown by chain double-dashed lines in FIG. 1.

During this time period, as shown in order in FIGS. 9C, 9B, and 9A, the switch lever 70 interacts with the linearly-movable shaft 10 over specific range E2, which causes the switch SW1 to be switched to the disconnected state. Thereafter, when the linearly-movable shaft 10 transitions from specific range E2 to separation range E3, the driven part 77 no longer engages with the actuating part 27, and the switch lever 70 no longer interacts with the linearly-movable shaft 10.

When the control part ascertains that the switch SW1 has switched to the disconnected state after the energizing of the electric motor 61 has started, the control part determines that the user has taken their hand off the lid body 5 and that the linearly-movable shaft 10 has been displaced to the first position shown in FIG. 8A. Then, the control part records (stores the status) that the manual opening operation performed by the user is complete and that the lid body 5 has pivoted to the open position, and also halts the energizing of the electric motor 61. As a result, the stopper 50 is returned to the blocking position by the biasing force of the compression-coil spring 50S.

It is noted that, in the event that the electric actuator 60 does not operate, for example during repair work or at the time of an anomaly, such as when the battery is disconnected or completely discharged, there are situations in which the user must pivot the lid body 5 held at the closed position shown in FIG. 2 to the open position shown in FIG. 1. In these situations, the user may press the manual-operation part 59 rearward to manually pivot the stopper 50 from the blocking position to the nonblocking position, and thereby the lid body 5 can be pivoted to the open position shown in FIG. 1.

Functions and Effects

In the lid-body opening/closing apparatus 1 of the working example, as shown, e.g., in FIGS. 8A-8D, one stopper 50 is used instead of the latch and pawl according to the above-described known lid-body opening/closing apparatus, and the stopper surface 55 of the stopper 50 directly engages with or separates from the engagement part 25 formed on the block 20 of the linearly-movable shaft 10. Thereby, in this lid-body opening/closing apparatus 1, it is possible for the stopper 50 to engage the linearly-movable shaft 10 more reliably than the pawl and latch in the above-described known lid-body opening/closing apparatus. Furthermore, it is possible to achieve a reduction in the part count and/or a simplification of the structure, and/or to reduce the effects of dimensional tolerances or assembly errors by using the single stopper 50.

Accordingly, with the lid-body opening/closing apparatus 1 according to the working example, it is possible to further improve the tightness of closure while simplifying the structure, achieve a lower manufacturing cost, and/or reduce the occurrence of malfunctions or abnormal noises due to backlash (play) among the structural components of the lid-body opening/closing apparatus 1. In addition, with the lid-body opening/closing apparatus 1, there are situations in which, to shorten the time that the lid body 5 stays in the pressed-in position, the manual closing operation is performed quickly by the user quickly pressing in the lid body 5 to the pressed-in position and then immediately removing their hand from the lid body 5. Even in such situations, the single stopper 50 promptly follows the linearly-movable shaft 10, which quickly returns to the second position after quickly (briefly) reaching the third position, and therefore the lid body 5 can be reliably held at the closed position.

In addition, with the lid-body opening/closing apparatus 1, owing to the configuration in which the stopper 50 is pivoted to the nonblocking position by the electric actuator 60, which is energized by the control part as a result of detection of the manual opening operation being performed by the user, the manual opening operation performed by the user can be simplified to a one-action manual operation of pressing in the lid body 5, and the holding of the lid body 5 can be easily released.

Furthermore, in the lid-body opening/closing apparatus 1, the electric actuator 60 is energized by the control part when actuated by the switch SW1 changing to the connected state after the lid body 5 has been held in the closed position. Thereby, with the lid-body opening/closing apparatus 1, the holding of the lid body 5 can be easily released by the one-action manual operation of pressing in the lid body 5 held at the closed position.

In addition, with the lid-body opening/closing apparatus 1, the linearly-movable shaft 10 comprises the linearly-movable-shaft main body 11 and the block 20. Furthermore, because the engagement part 25 is formed on the block 20, which has the highest degree of freedom in shape among the structural members of the linearly-movable shaft 10 and the rotary shaft 30, it is possible to easily make the engagement part 25 into a shape that reliably engages the stopper surface 55 of the stopper 50.

Furthermore, with the lid-body opening/closing apparatus 1, in the event that the electric actuator 60 does not operate, for example during repair work or at the time of an anomaly, such as when the battery is disconnected or completely discharged, the user presses the manual-operation part 59 shown in FIG. 2 rearward to manually pivot the stopper 50 from the blocking position shown by solid lines in FIG. 8D to the nonblocking position shown by chain double-dashed lines in FIG. 8D, and thereby the lid body 5 can be pivoted to the open position shown in FIG. 1.

Although a non-limiting embodiment of the present teachings was described above based on a working example, the present invention is not limited to the above-described working example and of course is applicable when changed appropriately within a scope that does not depart from the gist thereof.

For example, in the working example, the block 20 is a separate (discrete) member from the linearly-movable-shaft main body 11, but the present invention is not limited to this configuration. For example, in an embodiment in which the rotary shaft is inserted into the linearly-movable shaft from the lid-body side, it is possible to form the block integrally with the end part of the linearly-movable-shaft main body that is located on the side opposite the lid body.

In the working example, the stopper 50 engages (contacts) the block 20 of the linearly-movable shaft 10 in the blocking position and thereby prohibits (blocks) the linearly-movable shaft 10 from moving from the second position to the first position, but the present invention is not limited to this configuration. For example, the stopper may be configured/adapted such that it engages (contacts) the rotary shaft in the blocking position and thereby prohibits (blocks) the linearly-movable shaft from moving from the second position to the first position. In this alternate embodiment, an engagement part (e.g., a flange) that engages (contacts) the stopper is formed on the rotary shaft. Consequently, it is preferable to ensure sufficient space in the housing to enable the engagement part to move while rotating around the axial center.

In the working example, the manual-operation part 59 is formed integrally with the stopper 50, but the present invention is not limited to this configuration. For example, the manual-operation part may be formed as a separate (discrete) member that may be secured (affixed) to the stopper by a fastener, a fitting, adhesive or the like.

In the working example, the fuel-filling hole 8H is disposed inside the opening 8, but the present invention is not limited to this configuration. For example, a charging connector (electronic charging port for an electric vehicle) or the like may instead be disposed inside the opening. In addition, in the working example, electrical connection to the control part is achieved via the wire harness W1 that extends from the housing 90, but the present invention is not limited to this configuration. For example, an electrical connector may be provided in the housing and that electrical connector may be connected to a matching electrical connector provided inside the vehicle body.

The present invention may be utilized, e.g., in an automobile, bus, industrial vehicle, or other type of vehicle.

Additional embodiments of the present teachings include, but are not limited to:

1. A lid-body opening/closing apparatus (1) for use in a vehicle provided between an opening (8), which is provided on a vehicle body (9), and a lid body (5), which is capable of opening and closing the opening (8), wherein:
 the lid body (5) is displaceable in a range that includes: an open position at which the opening (8) is open, a closed position at which the opening (8) is closed, and a pressed-in position at which the lid body (5) is pressed in from the closed position toward a side opposite the open position; and
 the lid-body opening/closing apparatus (1) comprises:
 a housing (90) provided on the vehicle body (9);
 a linearly-movable shaft (10) that (i) extends centered on an axial center (X10) passing through the opening (8), (ii) is supported by the housing (90) such that the linearly-movable shaft (10) is capable of undergoing linear reciprocating motion in the direction of the axial center (X10) in a range that includes a first position corresponding to the open position, a second position corresponding to the closed position, and a third position corresponding to the pressed-in position, and such that the linearly-movable shaft (10) is nonrotatable about the axial center (X10), and (iii) is biased toward the first position;
 a rotary shaft (30) that (i) extends centered on the axial center (X10), and (ii) is supported by the linearly-movable shaft (10) such that the rotary shaft (30) is capable of undergoing linear reciprocating motion in the direction of the axial center (X10), and such that the rotary shaft (30) is rotatable around the axial center (X10); wherein, when the linearly-movable shaft (10) is disposed in the second position or the third position, it rotates to a latched position that latches the lid body (5), and when the linearly-movable shaft (10) is disposed in the first position, it rotates to an unlatched position that does not latch the lid body (5); and a stopper (50) that (i) is supported by the housing (90), (ii) is displaceable between a blocking position at which the stopper (50) engages one of the linearly-movable shaft (10) and the rotary shaft (30), thereby prohibiting the linearly-movable shaft (10) from moving from the second position to the first position, and a nonblocking position at which the stopper (50) is separated from the linearly-movable shaft (10), (iii) is biased toward the blocking position, and (iv) is displaced to the nonblocking position in response to a manual opening operation for displacing the lid body (5) to the open position.

2. The lid-body opening/closing apparatus (1) according to the above embodiment 1, further comprising an electric actuator (60) that: (i) is provided on the housing (90), (ii) is operably connected to the stopper (50) and (iii) is energized in response a manual opening operation to displace the stopper (50) to the nonblocking position.

3. The lid-body opening/closing apparatus (1) according to the above embodiment 2, further comprising:

a switch (SW1) that is provided on the housing (90) and is adapted to be placed into a connected state when the linearly-movable shaft (10) moves to the third position, wherein the electric actuator (60) is energized in response to the switch (SW1) being placed into the connected state after the lid body (5) has been held at the closed position.

4. The lid-body opening/closing apparatus (1) according to any one of the above embodiments 1-3, wherein the linearly-movable shaft (10) comprises:

a linearly-movable-shaft main body (11), which extends centered on the axial center (X10) and supports the rotary shaft (30) such that it is rotatable around the axial center (X10); and a block (20), which is provided on (at) an end portion (11H) of the linearly-movable-shaft main body (11) located on a side opposite from the lid body (5) in the direction of the axial center (X10) and moves integrally with the linearly-movable-shaft main body (11);

wherein an engagement part (25), which is adapted to engage with the stopper (50), is formed on the block (20).

5. The lid-body opening/closing apparatus (1) according to any one of the above embodiments 1-4, further comprising:

a manual-operation part (59) provided integrally on the stopper (50) and disposed such that it is manually operable from outside the housing (90), wherein the manual-operation part (59) is adapted to be manually operated to displace the stopper (50) to the nonblocking position.

6. The lid-body opening/closing apparatus (1) according to any one of the above embodiments 1-5, further comprising:

a control part adapted to detect whether a manual opening operation is being performed on the lid body (5) and in response to detecting that a manual opening operation is being performed to cause the stopper (50) to be displaced to the nonblocking position.

7. The lid-body opening/closing apparatus (1) according to the above embodiment 6, wherein:

the control part is adapted to store status information concerning whether a manual opening operation or a manual closing operation has been performed on the lid body (5), and the control part is adapted to energize the electric actuator (60) to cause the stopper (50) to displace to the nonblocking position in response to receiving a signal that the switch (SW1) has changed from the connected state to the disconnected state or vice versa after a manual closing operation was performed on the lid body (5) and status information was stored that the manual closing operation has been performed.

8. The lid-body opening/closing apparatus (1) according to any one of the above embodiments 1-7, wherein the rotary shaft (30) surrounds the linearly-movable shaft (10).

9. The lid-body opening/closing apparatus (1) according to any one of the above embodiments 1-8, wherein:

the linearly-movable shaft (10) is supported on a shaft-shaped guide (92A) attached to a housing case (92) of the housing (90);

the shaft-shaped guide (92A) extends in parallel to, offset from, the axial center (X10) of the linearly-movable shaft (10); and a compression spring (10S) surrounds the shaft-shaped guide (92A) and biases the linearly-movable shaft (10) toward the first position.

10. The lid-body opening/closing apparatus (1) according to any one of the above embodiments 2-9, wherein:

the stopper (50) includes a fan-shaped gear (56);

the electric actuator (60) includes an electric motor (61) that rotatably drives a worm gear (66); and the fan-shaped gear (56) meshes with the worm gear (66).

11. A vehicle comprising:

the lid body (5) pivotably coupled to the vehicle body (9) and configured to open and close the opening (i) by being pivotable in a pivot range that includes the open position of the lid body (5), the closed position of the lid body (5), and the pressed-in position of the lid body (5);

the lid-body opening/closing apparatus (1) of any one of the above embodiments 1-10 mounted on the vehicle body (9) via the housing (90) such that the axial center (X10) intersects the lid body (5) in the closed position of the lid body (5); and one of a liquid fuel-filling hole (8H) for receiving liquid fuel or a charging port for receiving electric current, the liquid fuel-filling hole (8H) or the charging port being disposed in the opening (8).

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved apparatuses and actuators for opening and closing a fuel door (lid body) of a vehicle.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block or component of a device, such as the control part (controller, processor) is also understood as a corresponding method step or as a feature of a method step. In an analogous manner, aspects which have been described in the context of or as a method step also represent a description of a corresponding block or detail or feature of a corresponding device, such as the control part.

Depending on certain implementation requirements, exemplary embodiments of the control part of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the control part, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using the apparatus 1.

Therefore, although some aspects of the control part have been identified as "parts" or "units" or "steps", it is understood that such parts or units or steps need not be physically separate or distinct electrical components, but rather may be different blocks of program code that are executed by the same hardware component, e.g., one or more microprocessors.

One representative, non-limiting algorithm for operating the electric actuator 60, which algorithm may be stored in and executed by the control part, may include the steps of: (i) waiting for a change of state signal (e.g., either a disconnection signal or a connection signal) from the switch SW1, (ii) when a change of state signal is received, check the status of the apparatus 1, (iii) if the status is that a manual closing operation was last performed, energizing the electric actuator 60 to move the stopper 50 to the nonblocking position and change the status to a manual opening operation was last performed, and (iv) if the status is that a manual opening operation was last performed, do not energize the electric actuator 60 (so that the stopper 50 remains in the blocking position) and change the status to a manual closing operation was last performed.

Furthermore, it is noted that the fan-shaped gear 56 and the worm gear 66 are preferably designed to provide a "backdriving" worm gear (pinion) arrangement, in which rotation of the fan-shaped gear 56 (driven component) caused by an external load (e.g., the compression-coil spring 50S that biases/urges the stopper 50 to pivot towards the blocking position) is applied to the worm gear 66 (driving component, also known as a pinion) when the electric motor 61 is not being energized to drive the worm gear 66. That is, a "backdriving" operation occurs when the fan-shaped gear (arcuate gear) 56 actively drives (rotates) the worm gear (pinion) owing to the fact that the worm gear 66 is free to rotate when the electric motor 61 is not being driven (energized). Such an arrangement is known as a non-self-locking worm gear (pinion) arrangement and may be constructed by appropriately designing the outer diameter of the worm gear (pinion) 66, the thread lead of the worm gear 66, the resulting thread angle of the worm gear 66, as well as providing low friction surface finishes (low coefficient of friction) on the fan-shaped gear 56 and the worm gear 66. For example, the thread angle of the worm gear 66 is preferably equal to or greater than 10°. The worm gear 66 and/or fan-shaped gear 56 may be lubricated to further reduce friction. Thus, referring to FIG. 5, energization (driving) of the electric motor 61 causes the worm gear 66 to rotate and pivot the fan-shaped gear 56 (and thus the stopper 50) in the counterclockwise direction toward the nonblocking position of the stopper 50. When the energization is stopped, the worm gear 66 is free to rotate in the opposite rotational direction, so that the fan-shaped gear 56 (and thus the stopper 50) pivot in the clockwise direction toward the blocking position of the stopper 50 owing to the biasing force of the compression-coil spring 50S that is normally biasing (pivoting) the stopper 50 toward the blocking position. Generally speaking, a non self-locking worm gear arrangement can be designed by setting the lead angle of the worm gear 66 to be greater than the friction angle, which is the arc tangent of the coefficient of friction of the contacting surfaces of the worm gear 66 and the fan-shaped gear 56.

EXPLANATION OF THE REFERENCE NUMBERS

1 Lid-body opening/closing apparatus for use in a vehicle
9 Vehicle body
8 Opening
5 Lid body
90 Housing
X10 Axial center
10 Linearly-movable shaft
30 Rotary shaft
50 Stopper
60 Electric actuator
SW1 Switch
11 Linearly-movable-shaft main body
11H End portion (base-end portion) of the linearly-movable-shaft main body that opposes the lid body in the direction of the axial center
20 Block
25 Engagement part
59 Manual-operation part

I claim:

1. An apparatus for opening and closing a lid of a vehicle, wherein the apparatus is at least partially provided between an opening on a vehicle body and the lid that is configured to open and close the opening, and
the lid is displaceable in a range that includes: an open position, at which the opening is open, a closed position, at which the opening is closed, and a pressed-in position, into which the lid is pressed from the closed position, the closed position being between the open position and the pressed-in position; and
the apparatus comprises:
a housing affixed to the vehicle body;
a linearly-movable shaft that:
(i) extends centered on an axial center passing through the opening,
(ii) is supported by the housing such that the linearly-movable shaft is configured to undergo linear reciprocating motion in a direction of the axial center in a range that includes a first position, corresponding to the open position, a second position corresponding to the closed position, and a third position corresponding to the pressed-in position, and such that the linearly-movable shaft is configured not to rotate around the axial center, and
(iii) is biased toward the first position;
a rotary shaft that (i) extends centered on the axial center, and (ii) is supported by the linearly-movable shaft such that the rotary shaft is configured to undergo linear reciprocating motion in the direction of the axial center and, such that the rotary shaft is configured to rotate around the axial center; wherein, when the linearly-movable shaft is disposed in the second position or the third position, the rotary shaft is configured to be rotated to a latched position, in which the rotary shaft latches the lid, and when the linearly-movable shaft is disposed in the first position, the rotary shaft is configured to be rotated to an unlatched position, in which the rotary shaft does not latch the lid; and
a stopper that:
(i) is supported by the housing,
(ii) is displaceable about a pivot-axis center perpendicular to the axial center between a blocking position at which the stopper engages the linearly-movable shaft, thereby prohibiting the linearly-movable shaft from moving from the second position to the first position, and a nonblocking position at which the stopper is separated from the linearly-movable shaft, thereby permitting the linearly-movable shaft to move from the second position to the first position,
(iii) is biased toward the blocking position, and
(iv) is configured to be displaced to the nonblocking position in response to a manual opening operation for displacing the lid to the open position; and
wherein the linearly-movable shaft comprises:
a main body that extends centered on the axial center and supports the rotary shaft such that the rotary shaft is rotatable around the axial center; and
a block provided on an end portion of the main body that is located opposite from the lid along the direction of the axial center, the block being configured to move integrally with the main body;
wherein an engagement part is configured to engage with the stopper;
the engagement part is formed on a portion of the block that is offset from the main body radially outward relative to the axial center and faces towards the lid in the direction of the axial center;
when the linearly-movable shaft is located at the first position, the pivot-axis center is located closer to the lid than the engagement part in the direction of the axial center;
a stopper surface of the stopper is a curved surface that faces away from the lid along the direction of the axial center and traces an arc centered on the pivot-axis center; and
when the stopper is located at the blocking position, the stopper surface engages with the engagement part.

2. The apparatus according to claim 1, further comprising an electric actuator that:
(i) is provided in the housing,
(ii) is operably connected to the stopper, and
(iii) is configured to be energized in response to the manual opening operation for displacing the stopper to the nonblocking position.

3. The apparatus according to claim 2, wherein:
the stopper includes a fan-shaped gear;
the electric actuator includes an electric motor that rotatably drives a worm gear; and
the fan-shaped gear meshes with the worm gear.

4. The apparatus according to claim 2, further comprising:
a switch provided in the housing and configured to be placed into a connected state when the linearly-movable shaft moves to the third position,
wherein the electric actuator is configured to be energized in response to the switch being placed into the connected state after the lid has been held at the closed position.

5. The apparatus according to claim 4, further comprising:
a manual-operation part provided integrally on the stopper and disposed such that the manual-operation part is manually operable from outside the housing, wherein the manual-operation part is configured to be manually operated to displace the stopper to the nonblocking position.

6. The apparatus according to claim 5, further comprising a control part configured to:
detect whether the manual opening operation is being performed on the lid; and
in response to detecting that the manual opening operation is being performed, cause the stopper to be displaced to the nonblocking position.

7. The apparatus according to claim 6, wherein:
the control part is configured to store status information concerning whether the manual opening operation or a manual closing operation has been performed on the lid, and
the control part is configured to energize the electric actuator to cause the stopper to displace to the nonblocking position in response to receiving a signal that the switch has changed from the connected state to the disconnected state or vice versa after the manual closing operation was performed on the lid and status information was stored that the manual closing operation has been performed.

8. The apparatus according to claim 7, wherein the rotary shaft is tubular and surrounds the linearly-movable shaft.

9. The apparatus according to claim 8, wherein:
the linearly-movable shaft is supported on a shaft-shaped guide attached to a housing case of the housing;
the shaft-shaped guide extends in parallel and offset from the axial center of the linearly-movable shaft; and
a compression spring surrounds the shaft-shaped guide and biases the linearly-movable shaft toward the first position.

10. The apparatus according to claim 9, wherein:
the stopper includes a fan-shaped gear;
the electric actuator includes an electric motor that rotatably drives a worm gear; and
the fan-shaped gear meshes with the worm gear.

11. The apparatus according to claim 1, further comprising:
a switch provided in the housing and configured to be placed into a connected state when the linearly-movable shaft moves to the third position,
wherein an electric actuator is configured to be energized in response to the switch being placed into the connected state after the lid has been held at the closed position to displace the stopper to the nonblocking position.

12. The apparatus according to claim 1, further comprising:
a manual-operation part provided integrally on the stopper and disposed such that the manual-operation part is manually operable from outside the housing,
wherein the manual-operation part is configured to be manually operated to displace the stopper to the nonblocking position.

13. An apparatus for opening and latching a lid of a vehicle, comprising:
a housing configured to be affixed to a body of the vehicle;
a linearly-movable shaft supported by the housing to be reciprocally movable relative to the housing along an axial centerline in a linear range that includes a first position corresponding to an open position of the lid, a second position corresponding to a closed position of the lid, and a third position corresponding to a pressed-in position of the lid, the second position being between the first position and the third position;
a rotary shaft disposed around the linearly-movable shaft and being rotatable around the axial centerline relative to the linearly-movable shaft; and
a stopper pivotably supported by the housing so as to be pivotable between a blocking position, at which the stopper engages the linearly-movable shaft, and thereby blocks the linearly-movable shaft from moving from the second position to the first position, and a nonblocking position, at which the stopper is separated from the linearly-movable shaft and thereby does not block the linearly-movable shaft from moving from the second position to the first position,
wherein:
the linearly-movable shaft is nonrotatable around the axial centerline relative to the housing and is biased toward the first position;
the rotary shaft is configured to be rotated to a latched position, at which the rotary shaft latches the lid in response to the linearly-movable shaft being moved to the second position or the third position, and is configured to be rotated to an unlatched position, at which the rotary shaft does not latch the lid in response to the linearly-movable shaft being moved to the first position;
the stopper is biased toward the blocking position, and is configured to be pivoted to the nonblocking position in response to detection of a manual opening operation, in which the linearly-movable shaft is moved from the second position to the third position;
the linearly-movable shaft includes an engagement surface; and
the stopper includes a stopper surface configured to contact the engagement surface in the blocking position and thereby block movement of the linearly-movable shaft from the second position to the first position.

14. The apparatus according to claim 13, further comprising:
an electric motor configured to pivot the stopper to the nonblocking position in response to the detection of the manual opening operation.

15. The apparatus according to claim 14, further comprising:
a switch; and
a control part configured to receive a signal from the switch and to control energization of the electric motor in accordance with the signal from the switch;
wherein the linearly-movable shaft includes an actuating part operably coupled to the switch such that movement of the linearly-movable shaft from the second position to the third position causes the switch to change its state and the signal output from the switch.

16. The apparatus according to claim 15, wherein:
the stopper includes an arcuate gear;
the electric motor is configured to rotatably drive a worm gear;
the arcuate gear meshes with the worm gear; and
the electric motor, the worm gear, and the arcuate gear are configured such that:
in response to the switch changing its state, the electric motor is energized to rotatably drive the worm gear in a first rotational direction and thereby the meshing of the rotating worm gear with the arcuate gear causes the stopper to pivot toward the nonblocking position; and
in response to the energization of the electric motor being terminated, the worm gear becomes free to rotate in a second rotational direction that is opposite of the first rotational direction such that the biasing force applied to the stopper causes the stopper to pivot toward the blocking position and the meshing of the rotating arcuate gear with the worm gear causes the worm gear to rotate in the second rotational direction.

17. The apparatus according to claim 13, further comprising:
a manual-operation part provided integrally on the stopper and disposed such that the manual-operation part is manually operable from outside the housing,
wherein the manual-operation part is configured to be manually operated to displace the stopper to the nonblocking position.

18. The apparatus according to claim 13, wherein:
the stopper is pivotable about a pivot-axis center perpendicular to the axial centerline between the blocking position and the nonblocking position;
the engagement surface is formed on a portion of the linearly-movable shaft that is offset from a main body of the linearly-movable shaft radially outward relative to the axial centerline and faces towards the lid in a direction of the axial centerline;
when the linearly-movable shaft is located at the first position, the pivot-axis center is located closer to the lid than the engagement surface in the direction of the axial centerline;
the stopper surface is a curved surface that faces away from the lid along the direction of the axial centerline and traces an arc centered on the pivot-axis center; and
when the stopper is located at the blocking position, the stopper surface engages with the engagement surface.

19. A vehicle comprising:
a lid pivotably coupled to a vehicle body and configured to open and close an opening in the vehicle body by being pivotable in a pivot range that includes an open position of the lid, a closed position of the lid, and a pressed-in position of the lid;
the apparatus of claim 1 mounted on the vehicle body via the housing such that the axial center intersects the lid in the closed position of the lid; and
one of a liquid fuel-filling hole for receiving liquid fuel or a charging port for receiving electric current, the liquid fuel-filling hole or the charging port being disposed in the opening.

20. A vehicle comprising:
a lid pivotably coupled to a vehicle body and configured to open and close an opening in the vehicle body by being pivotable in a pivot range that includes an open position of the lid, a closed position of the lid, and a pressed-in position of the lid;
the apparatus of claim 16 mounted on the vehicle body via the housing such that the axial centerline intersects the lid in the closed position of the lid; and
one of a liquid fuel-filling hole for receiving liquid fuel or a charging port for receiving electric current, the liquid fuel-filling hole or the charging port being disposed in the opening.

* * * * *